(12) United States Patent
Ford et al.

(10) Patent No.: US 7,994,456 B2
(45) Date of Patent: Aug. 9, 2011

(54) CONSTRUCT FOR SUPPORTING FOOD ITEMS

(75) Inventors: Colin Ford, Woodstock, GA (US); Daniel J. Keefe, Cincinnati, OH (US)

(73) Assignee: Graphic Packaging International, Inc., Marietta, GA (US)

( * ) Notice: Subject to any disclaimer, the term of this patent is extended or adjusted under 35 U.S.C. 154(b) by 1164 days.

(21) Appl. No.: 11/729,583

(22) Filed: Mar. 29, 2007

(65) Prior Publication Data

US 2007/0246460 A1 Oct. 25, 2007

Related U.S. Application Data

(60) Provisional application No. 60/788,344, filed on Mar. 31, 2006, provisional application No. 60/795,320, filed on Apr. 27, 2006.

(51) Int. Cl.
*H05B 6/80* (2006.01)
(52) U.S. Cl. .................. 219/730; 219/728; 426/107
(58) Field of Classification Search .................. 219/730, 219/728, 759; 426/107, 109, 111, 113, 234, 426/241, 243; 206/193, 167, 203; 99/DIG. 14
See application file for complete search history.

(56) References Cited

U.S. PATENT DOCUMENTS

| | | | |
|---|---|---|---|
| 1,913,655 A | 6/1933 | Benoit | |
| 2,961,123 A * | 11/1960 | Boydak et al. | ................. 206/193 |
| 4,108,349 A * | 8/1978 | Pfaffendorf | .............. 229/120.26 |
| 4,748,308 A | 5/1988 | Drews | |
| 4,775,771 A | 10/1988 | Pawlowski | |
| 4,848,931 A | 7/1989 | Kamada | |
| 4,865,921 A | 9/1989 | Hollenberg | |
| 4,890,439 A | 1/1990 | Smart | |
| 4,935,592 A | 6/1990 | Oppenheimer | |
| 4,936,935 A | 6/1990 | Beckett | |
| 4,963,424 A | 10/1990 | Beckett | |
| 5,034,234 A * | 7/1991 | Andreas et al. | ............... 426/107 |
| 5,039,364 A | 8/1991 | Beckett | |
| 5,117,078 A | 5/1992 | Beckett | |
| 5,175,404 A | 12/1992 | Andreas et al. | |
| 5,213,902 A | 5/1993 | Beckett | |
| 5,221,419 A | 6/1993 | Beckett | |
| 5,260,537 A | 11/1993 | Beckett | |
| 5,266,386 A | 11/1993 | Beckett | |
| 5,310,977 A | 5/1994 | Stenkamp et al. | |
| RE34,683 E | 8/1994 | Maynard | |

(Continued)

FOREIGN PATENT DOCUMENTS

DE 27 18 133 A1 2/1978

(Continued)

OTHER PUBLICATIONS

International Search Report—PCT/US2007/007589.

(Continued)

*Primary Examiner* — Quang T Van
(74) *Attorney, Agent, or Firm* — Womble Carlyle Sandridge & Rice, PLLC

(57) ABSTRACT

A construct for supporting a food item includes a plurality of divider walls and a plurality of base panels. The divider walls are spaced from one another along a length of the construct. Each base panel is located between a pair of adjacent divider walls and connecting the adjacent divider walls. A microwave energy interactive element may overlie a surface of the construct.

39 Claims, 24 Drawing Sheets

U.S. PATENT DOCUMENTS

| | | | |
|---|---|---|---|
| 5,340,436 | A | 8/1994 | Beckett |
| 5,354,973 | A | 10/1994 | Beckett |
| 5,410,135 | A | 4/1995 | Pollart |
| 5,424,517 | A | 6/1995 | Habeger |
| 5,519,195 | A | 5/1996 | Keefer |
| 5,628,921 | A | 5/1997 | Beckett |
| 5,672,407 | A | 9/1997 | Beckett |
| 5,759,422 | A | 6/1998 | Schmelzer |
| 5,800,724 | A | 9/1998 | Habeger |
| 6,114,679 | A | 9/2000 | Lai |
| 6,150,646 | A | 11/2000 | Lai |
| 6,204,492 | B1 | 3/2001 | Zeng |
| 6,251,451 | B1 | 6/2001 | Zeng |
| 6,303,913 | B1 | 10/2001 | Bono |
| 6,303,914 | B1 | 10/2001 | Bono |
| 6,414,288 | B1 | 7/2002 | Bono |
| 6,414,290 | B1 | 7/2002 | Cole |
| 6,433,322 | B2 | 8/2002 | Zeng |
| 6,455,827 | B2 | 9/2002 | Zeng |
| 6,552,315 | B2 | 4/2003 | Zeng |
| 6,677,563 | B2 | 1/2004 | Lai |
| 6,717,121 | B2 | 4/2004 | Zeng |
| 6,765,182 | B2 | 7/2004 | Cole |
| 7,019,271 | B2 | 3/2006 | Wnek |

FOREIGN PATENT DOCUMENTS

| | | |
|---|---|---|
| FR | 2 466 401 | 10/1981 |
| JP | 10 310127 | 11/1998 |
| WO | WO 93/17532 | 9/1993 |
| WO | WO 03/066435 A2 | 8/2003 |

OTHER PUBLICATIONS

Written Opinion—PCT/US2007/007589.

* cited by examiner

CONSTRUCT FOR SUPPORTING FOOD ITEMS

CROSS-REFERENCE TO RELATED APPLICATIONS

This application claims the benefit of U.S. Provisional Application No. 60/788,344, filed Mar. 31, 2006, and U.S. Provisional Application No. 60/795,320, filed Apr. 27, 2006, both of which are incorporated by reference herein in their entirety.

TECHNICAL FIELD

The present invention relates to various blanks, constructs, packages, and systems for supporting one or more food items. Such blanks, constructs, packages, and systems may include features for heating, browning, and/or crisping such food items in a microwave oven.

BACKGROUND

Microwave ovens provide a convenient means of preparing a food item for consumption by a user. However, microwave ovens tend to cook such items unevenly and often are not capable of achieving a comparable level of browning and/or crisping of some food items that might be attained using a conventional oven, toaster oven, or toaster, particularly dough-based or breaded food items. At the same time, such appliances often require greater time to pre-heat and/or pre-pare such food items. Additionally, in some circumstances, such appliances are not convenient to a user and/or are not permitted to be used. For example, many universities, hospitals, hotels, workplaces, and other institutions do not permit residents to use a toaster, toaster oven, or conventional oven within individual rooms or offices. However, many of such institutions allow use of a microwave oven, either within individual rooms or offices, or in shared areas, such as kitchens, cafeterias, or break rooms. As such, there is a continuing need for materials, constructs, and systems that enable a user to prepare toast, waffles, French toast, bagels, English muffins, sandwiches, pastries, breaded meats, and other items that are desirably browned and/or crisped in a microwave oven. There is also a need for containing one or more food items in a separated configuration before, during, and/or after heating.

SUMMARY

The present invention is directed generally to various blanks, constructs, packages, and systems for supporting one or more food items. The various constructs may be used to contain the food items and, optionally, may be used to heat, brown, and/or crisp the food items in a microwave oven. If desired, the various blanks, constructs, packages, and systems of the invention may include features that alter the effect of microwave energy on the food items. Such blanks, constructs, packages and systems also may facilitate storage of a plurality of food items that are desirably separated from one another.

In one exemplary aspect, the invention is directed to a construct for supporting a plurality of food items. The construct includes a plurality of divider walls and a plurality of base panels. The divider walls are spaced from one another along a length of the construct. Each base panel is located between a pair of adjacent divider walls and connecting the adjacent divider walls. If desired, the construct may be retained within at least four walls of a carton.

In one variation, each divider wall comprises a pair of foldably connected separator panels. Each pair of separator panels may comprise a first separator panel foldably connected to a second separator panel at a spine fold line. In one example, the separator panels are substantially upright. In another example, the separator panels are substantially upright and the base panels are substantially transverse to the separator panels. In yet another example, the separator panels are substantially flattened and the base panels are substantially parallel with the separator panels.

The first separator panel may be folded about the spine fold line of the separator panel pair so that it is adjacent to the second separator panel of the pair. For each pair of separator panels, the first separator panel may be foldably connected to a first base panel of the base panels, and the second separator panel may be foldably connected to a second base panel of the base panels. The first base panel may be interlocked with the second base panel.

In one variation, the first base panel may be interlocked with the second base panel at a locking feature located at an edge of the construct. Alternatively, the first base panel may be interlocked with the second base panel at a locking feature located in an interior section of the first base panel.

In another variation, the construct comprises at least one locking feature, where each locking feature comprises a plurality of locking projections. Each locking projection may extend between two adjacent divider walls and may overlie at least one of the base panels. The at least one locking feature may be foldably connected to one of the base panels.

In still another variation, each of the first separator panel and the second separator panel have a first surface, and a microwave energy interactive material overlies at least a portion of the first surface of the first separator panel and at least a portion of the first surface of the second separator panel. In one example, the microwave energy material element forms a susceptor.

In another exemplary aspect, the invention is directed to a blank for forming a construct for containing one or more food items therein. The blank has a longitudinal dimension and a transverse dimension and comprises a plurality of separator panel pairs and a plurality of base panels. Each pair of separator panels comprises a first separator panel foldably connected to a second separator panel at a transverse spine fold line. Each base panel connects a separator panel of one separator panel pair to a separator panel of an adjacent separator panel pair along at least one a transverse fold line.

Each base panel may comprise a substantially rectangular center section. Each base panel also may comprise at least one locking feature. In one variation, each base panel comprises a first locking feature at one side of the base panel and a second locking feature at a second side of the base panel. In another variation, the locking feature comprises a plurality of locking projections. In an example of this variation, the locking projections extend along the transverse direction. In still another variation, the at least one locking feature may be foldably connected to one of the base panels.

A microwave energy interactive element including a microwave energy interactive material may overlie at least a portion of at least one of the separator panel pairs. In one example, the first separator panel and the second separator panel each comprise a food-contacting side, a first microwave energy interactive element overlies at least a portion of the food-contacting side of the first separator panel, and a second microwave energy interactive element overlies at least a portion of the food-contacting side of the second separator panel. In another example, the first microwave energy interactive element and the second microwave energy interactive element each comprise a layer of microwave energy interactive material that converts microwave energy into thermal energy.

In yet another aspect, the invention is directed to a system for heating, browning, and/or crisping a food item in a microwave oven. The system comprises a base, at least two structures extending upwardly from the base, and at least two microwave energy interactive sleeves. Each sleeve is dimensioned to encircle one of the structures. The microwave energy interactive sleeves may be arranged in a substantially parallel configuration with a space therebetween. The space between the sleeves is dimensioned to receive the food item to be heated, browned, and/or crisped.

In one variation, each of the structures comprises a pair of opposed pegs. Each of the pegs may be removably seated within a corresponding slot in the base. Further, each of the pegs may be seated on a shoulder extending upwardly from the base.

In yet another variation, each microwave energy interactive sleeve comprises an outer surface at least partially defined by a susceptor film. In still another variation, each microwave energy interactive sleeve comprises an outer surface at least partially defined by a microwave energy interactive insulating material including a susceptor film comprising a microwave energy interactive material supported on a first polymeric film layer, a moisture-containing layer superposed with the microwave energy interactive material, and a second polymeric film layer joined to the moisture-containing layer in a predetermined pattern, thereby forming at least one closed cell between the moisture-containing layer and the second polymeric film layer. The moisture-containing layer is positioned between the microwave energy interactive material and the second polymeric film layer.

Other aspects, features, and advantages of the invention will become apparent from the following description and accompanying figures.

BRIEF DESCRIPTION OF THE DRAWINGS

The description refers to the accompanying drawings, some of which are schematic. According to common practice, the various features of the drawings discussed below are not necessarily drawn to scale. Dimensions of various features and elements in the drawings may be expanded or reduced to illustrate the features of the invention more clearly.

DESCRIPTION

Various aspects of the invention may be illustrated by referring to the figures. Although several different exemplary aspects, implementations, and embodiments of the various inventions are provided, numerous interrelationships between, combinations thereof, and modifications of the various inventions, aspects, implementations, and embodiments of the inventions are contemplated hereby.

Figure 1A:
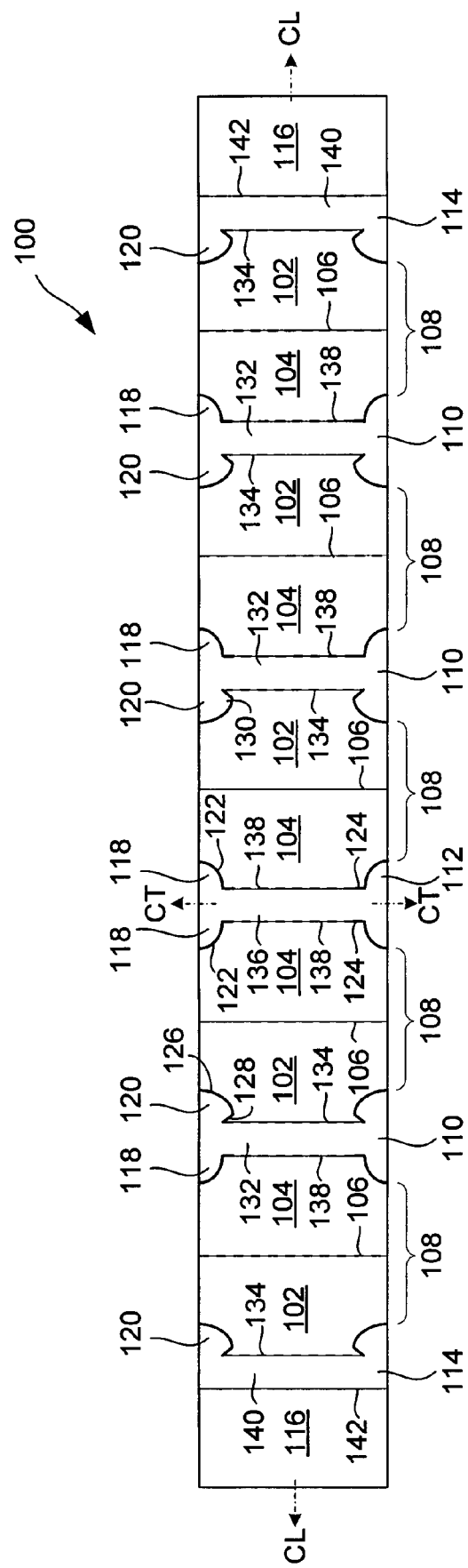
FIG. 1A is a plan view of an exemplary blank according to various aspects of the invention.
Figure 1B:
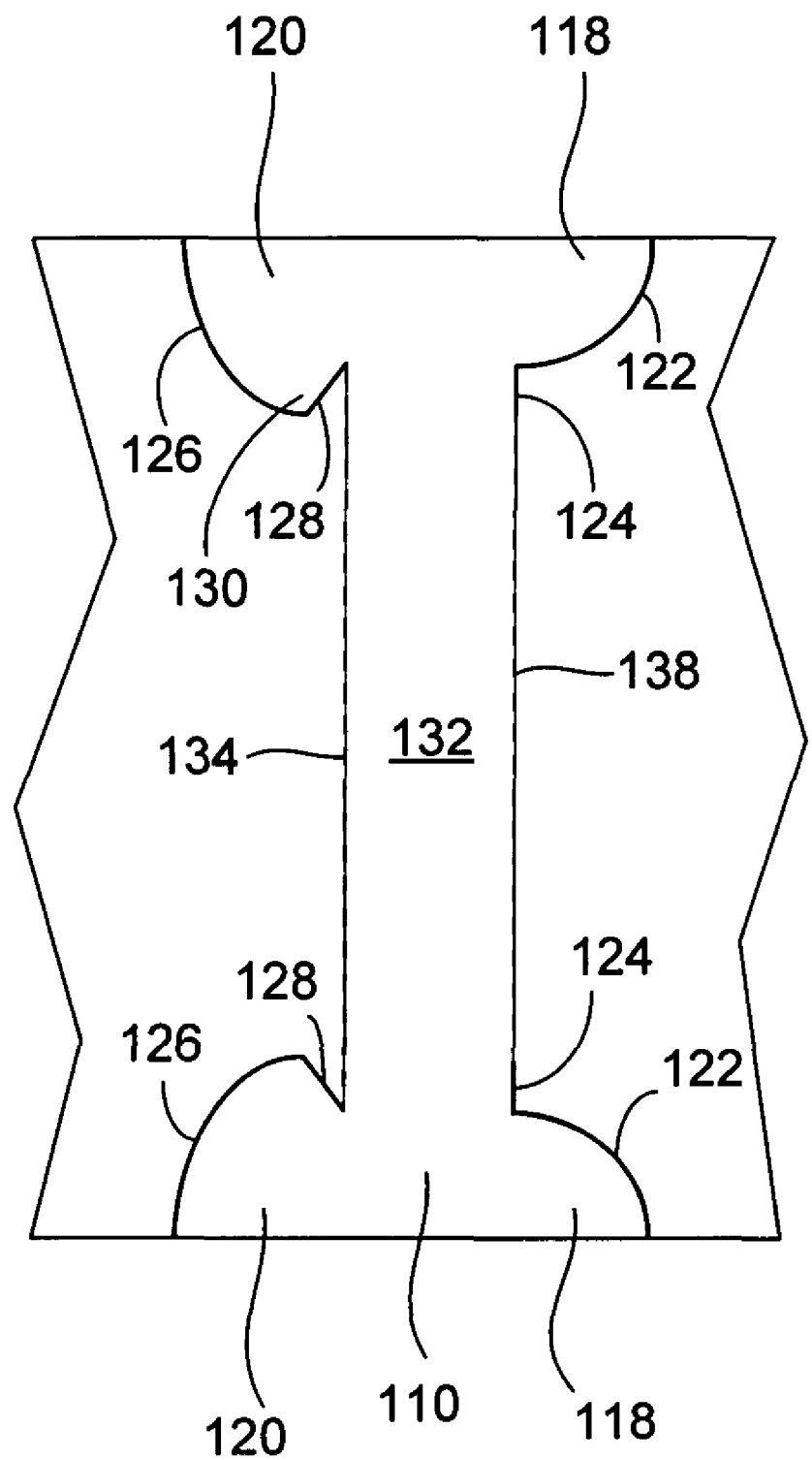
FIG. 1B is a detail view of a portion of the blank of FIG. 1A.

FIG. 1A is a plan view of an exemplary blank 100 used to form a construct 144 (illustrated in FIG. 1D) according to various aspects of the invention. In this and other aspects, the construct 144 (FIG. 1D) may be used to support one or more food items in a generally vertical, upstanding configuration during shipping, storage, heating, and/or serving. In this manner, the items are generally separated from one another, thereby minimizing damage to, and/or facilitating heating of, the food items.

Viewing FIG. 1A, the blank 100 is a generally elongate strip comprising a plurality of first and second separator panels 102, 104 foldably connected along transverse spine fold lines 106. The separator panels 102, 104 are arranged in pairs 108 that form divider walls 146 in a construct 144 (FIG. 1D) erected from the blank 100. The exemplary blank 100 of FIG. 1A includes five panel pairs 108, with adjacent panel pairs 108 connected to one another by base panels 110 or 112. However, fewer or more panel pairs 108 can be included if desired, depending upon the number of food items to be stored and/or heated within the construct 144. A distal base panel 114 is foldably connected to a panel pair 108 at each end of the blank 100. An end panel 116 may be foldably connected at each end of the blank 100. The blank 100 may be wholly or partially symmetrical about a longitudinal center line CL.

In the exemplary embodiment, one base panel 110 is located to the left of base panel 112, which is symmetrical about a transverse centerline CT, and two base panels 110 are located to the right of symmetrical base panel 112. The base panel 110 to the left of the base panel 112 is a mirror image of the base panels 110 to the right. Similarly, the separator panel pairs 108 to the left of symmetrical base panel 112 are mirror images of the separator panel pairs 108 to the right of symmetrical base panel 112.

The base panels 110 include first and second locking features 118, 120 at each end of each panel 110. Each first locking feature 118 is defined in part by a curved or arcuate cut 122 that may be coterminous with a transverse cut 124. It will be understood that each cut disclosed herein may more specifically be in the form of a slit.

Each second locking feature 120 is defined in part by a curved or arcuate cut 126 and an oblique cut 128 extending from an end of the curved cut 126. The curved cut 126 and the oblique cut 128 define a locking projection 130 of the second locking feature 120. Elongate, generally rectangular center sections 132 of the base panels 110 are foldably connected to adjacent first separator panels 102 along transverse fold lines 134, and foldably connected to adjacent second separator panels 104 along transverse fold lines 138.

The symmetrical base panel 112 may have a pair of the first locking features 118 at each end of the panel 112. Additionally, the symmetrical base panel 112 includes an elongate, generally rectangular center section 136 foldably connected to adjacent second separator panels 104 along transverse fold lines 138. Likewise, elongate, generally rectangular center sections 140 of the distal base panels 114 are foldably connected to an adjacent first separator panel 102 along transverse fold line 134, and to an adjacent end panel 116 along transverse fold line 142. A second locking feature 120 is located at each end of each of the distal base panels 114.

It will be understood that any of the various fold lines described herein or contemplated hereby may be any substantially linear, although not necessarily straight, form of disruption or weakening that facilitates folding or bending of the blank therealong. For example, transverse fold lines 134, 138, and 142 are shown schematically in FIG. 1A as cut-crease lines. However, such lines and any of the others herein may be score lines, crease lines, a cut or a series of cuts that extend partially into and/or completely through the material along a desired line of weakness, or various combinations of these features.

Figure 1C:
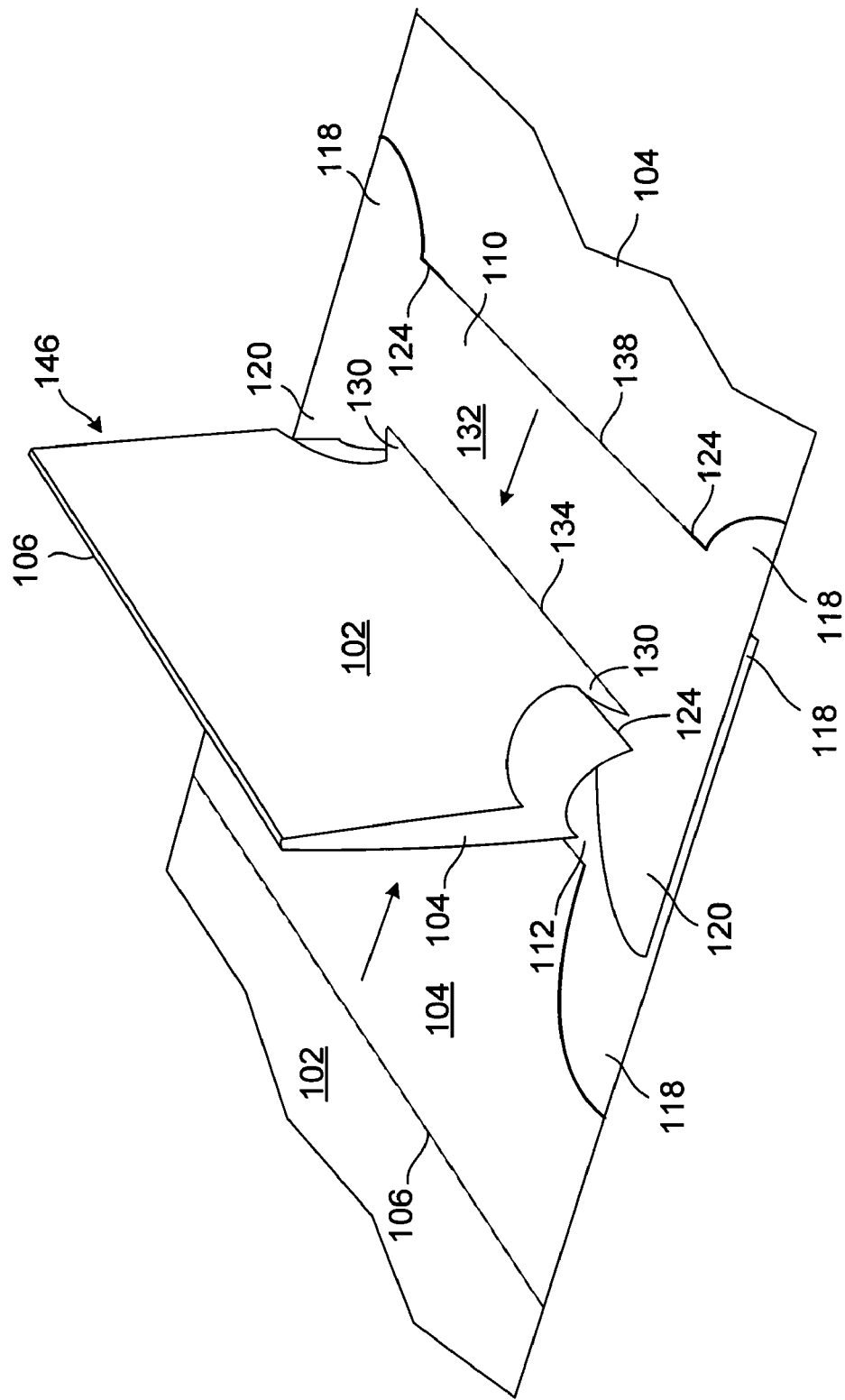
FIG. 1C illustrates a portion of the blank of FIG. 1A, partially erected into a construct.

One exemplary method of erecting a construct 144 from the blank 100 will now be discussed with reference to FIGS. 1A-1D. As shown in FIG. 1C, the ends of the blank 100 are advanced toward one another in the direction of the arrows so that the blank 100 folds along transverse fold lines 134 and 138. At the same time, separator panels 102, 104 fold with respect to one another along transverse spine fold line 106.

As base panels 110 and 112 are brought toward one another, the second locking features 120 at one side of the base panel 110 slide through the cuts 124 extending along the transverse fold line 138. When the separator panels 102 and 104 are abutting or nearly abutting, the locking projections 130 of the second locking feature 120 maintain the base panels 110 and 112 in the overlapping, interlocked position shown in FIGS. 1C and 1D with locking feature 120 overlying locking feature 118. With the base panels 110 and 112 engaged, the separator panels 102 and 104 are vertical or generally upright and form a separator wall 146. In the same manner, additional separator walls 146 may be formed from the other separator panel pairs 108 of the blank 100.

Figure 1D:
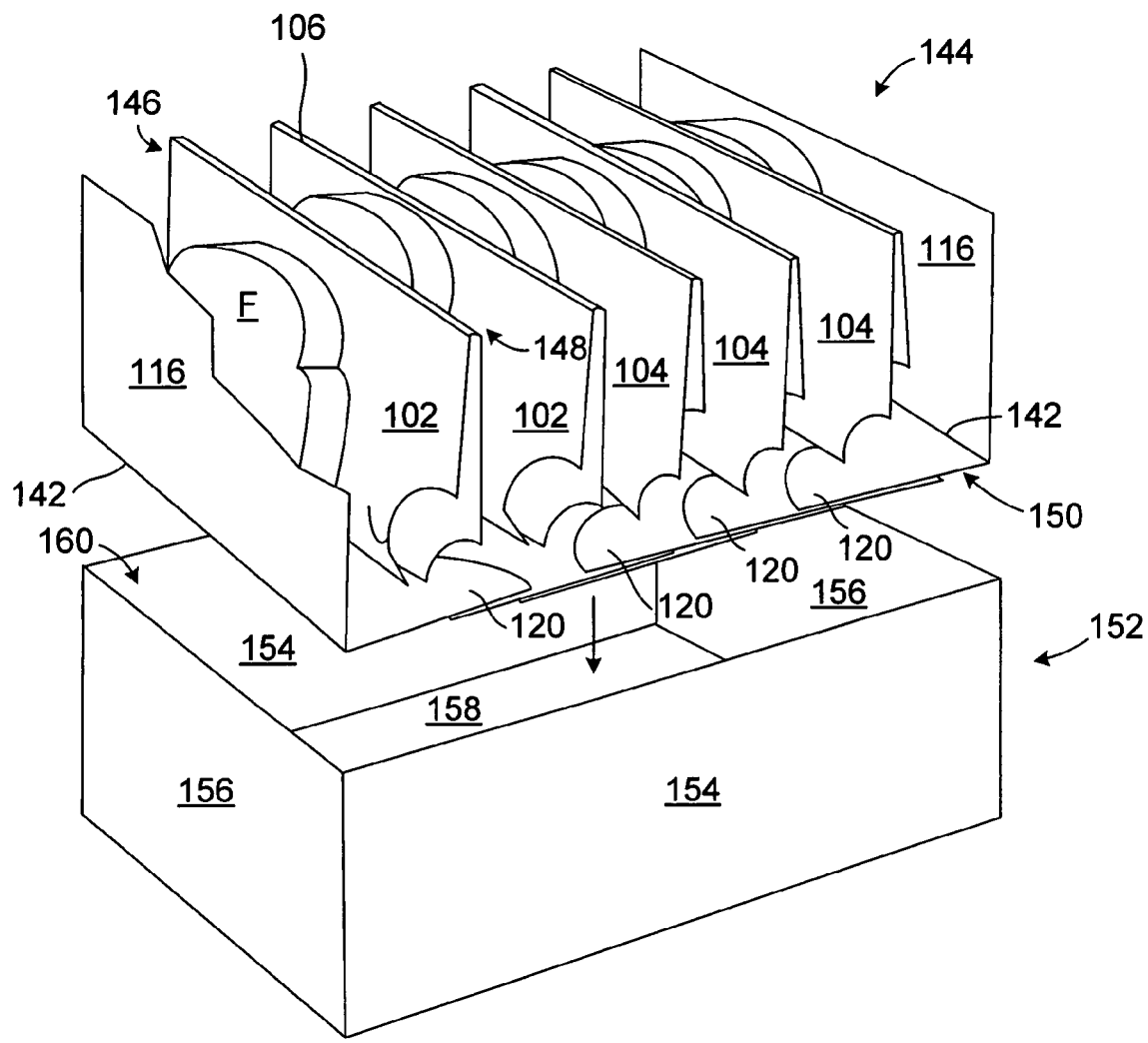
FIG. 1D illustrates an exemplary construct erected from the blank of FIG. 1A in an exploded configuration with respect to an outer carton, according to various aspects of the invention.

FIG. 1D illustrates an exemplary construct 144 formed from the blank 100 of FIG. 1A, with each of the panel pairs 108 formed into separator walls 146 and end panels 116 folded upwardly about transverse fold lines 142. The separator walls 146 and the upright end panels 116 collectively form a plurality of receptacle slots 148 (that may generally resemble an accordion shape) in which one or more food items F may be received in a generally vertical, upstanding configuration. The end panel 116 in the foreground of FIG. 1D is shown partially cut away to illustrate a portion of the food item F in the foremost receptacle slot 148. The interlocked base panels 110, 112, and 114 of the blank 100 form a base 150 on which the food items may be seated within the construct 144.

According to one aspect of the present invention, the construct 144 can be erected from the blank 100 without the use of glue or other adhesives. According to another aspect, after the construct 144 has been erected, the separator walls 146 and the end panels 116 can be folded over so the construct 144 can be shipped flat.

If desired, the construct 144 may be placed into an outer container or carton 152, as shown in FIG. 1D. In this manner, one or more food items may be positioned within the receptacle slots 148 of the construct 144 prior to shipping and/or sale of the various food items. In this example, the carton 152 is a generally parallelepipedal structure having opposed side walls 154, end walls 156, a bottom wall 158, and an open top 160 through which the construct 144 is placed in the carton 152. However, other carton shapes and configuration are contemplated hereby. It will be understood that, in the present specification, a "panel," "base" or "wall" need not be flat or otherwise planar. A "panel", "base", or "wall" can, for example, comprise a plurality of interconnected generally flat or planar sections. If desired, the carton 152 may be dimensioned such that various walls of the carton assist with maintaining the construct 144 in its upright, locked position.

In this and other aspects of the invention, all or a portion of the various blanks, constructs, and/or containers may be formed, for example, at least partially from a paperboard material. For example, the various blanks, constructs, and/or containers may be formed from paperboard having a basis weight of from about 60 to about 330 lbs/ream (lbs/3000 sq. ft), for example, from about 80 to about 140 lbs/ream. The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International.

Alternatively, the various blanks, constructs, and/or containers may comprise a paper or paper-based material generally having a basis weight of from about 15 to about 60 lbs/ream, for example, from about 20 to about 40 lbs/ream. In one particular example, the paper has a basis weight of about 25 lbs/ream.

If desired, one or more microwave energy interactive elements may overlie and/or be joined to at least a portion of any of the various blanks and/or constructs of the invention. Each microwave interactive element may comprise one or more microwave energy interactive materials or segments arranged in a particular configuration to absorb microwave energy, transmit microwave energy, reflect microwave energy, or direct microwave energy, as needed or desired for a particular microwave heating application. As a result, one or more of the elements may promote browning and/or crisping of the food item, shield the food item from microwave energy to prevent overcooking the food item in that area, or transmit microwave energy towards or away from a particular portion of the food item.

If desired, the microwave interactive element may be supported on a microwave inactive or transparent substrate for ease of handling and/or to prevent contact between the microwave interactive material and the food item. As a matter of convenience and not limitation, and although it is understood that a microwave interactive element supported on a microwave transparent substrate includes both microwave interactive and microwave inactive elements or components, such structures may be referred to herein as "microwave interactive webs".

The microwave energy interactive material may comprise an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable for use with the present invention include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide. Examples of metal oxides that may be suitable for use with the present invention include, but are not limited to, oxides of aluminum, iron, and tin, used in conjunction with an electrically conductive material where needed. Another example of a metal oxide that may be suitable for use with the present invention is indium tin oxide (ITO). ITO can be used as a microwave energy interactive material to provide a heating effect, a shielding effect, a browning and/or crisping effect, or a combination thereof. For example, to form a susceptor, ITO may be sputtered onto a clear polymeric film. The sputtering process typically occurs at a lower temperature than the evaporative deposition process used for metal deposition. ITO has a more uniform crystal structure and, therefore, is clear at most coating thicknesses. Additionally, ITO can be used for either heating or field management effects. ITO also may have fewer defects than metals, thereby making thick coatings of ITO more suitable for field management than thick coatings of metals, such as aluminum.

Alternatively, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In one example, the microwave interactive element may comprise a thin layer of microwave interactive material that tends to absorb microwave energy, thereby generating heat at the interface with a food item. Such elements often are used to promote browning and/or crisping of the surface of a food item (sometimes referred to as a "browning and/or crisping element"). When supported on a film or other substrate, such an element may be referred to as a "susceptor film" or, simply, "susceptor".

As another example, the microwave interactive element may comprise a foil having a thickness sufficient to shield one or more selected portions of the food item from microwave energy (sometimes referred to as a "shielding element"). Such shielding elements may be used where the food item is prone to scorching or drying out during heating.

The shielding element may be formed from various materials and may have various configurations, depending on the particular application for which the shielding element is used. Typically, the shielding element is formed from a conductive, reflective metal or metal alloy, for example, aluminum, copper, or stainless steel. The shielding element generally may have a thickness of from about 0.000285 inches to about 0.05 inches. In one aspect, the shielding element has a thickness of from about 0.0003 inches to about 0.03 inches. In another aspect, the shielding element has a thickness of from about 0.00035 inches to about 0.020 inches, for example, 0.016 inches.

As still another example, the microwave interactive element may comprise a segmented foil, such as, but not limited to, those described in U.S. Pat. Nos. 6,204,492, 6,433,322, 6,552,315, and 6,677,563, each of which is incorporated by reference in its entirety. Although segmented foils are not continuous, appropriately spaced groupings of such segments often act as a transmitting element to direct microwave energy to specific areas of the food item. Such foils also may be used in combination with browning and/or crisping elements, for example, susceptors.

As indicated above, any of the above microwave energy interactive elements used in accordance with the invention may be supported on a substrate. The substrate typically comprises an electrical insulator, for example, a film formed from a polymer or polymeric material. As used herein the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries.

The thickness of the film typically may be from about 35 gauge to about 10 mil. In one aspect, the thickness of the film is from about 40 to about 80 gauge. In another aspect, the thickness of the film is from about 45 to about 50 gauge. In still another aspect, the thickness of the film is about 48 gauge. Examples of polymeric films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used.

The polymer film may be selected to impart various properties to the microwave interactive web, for example, printability, heat resistance, or any other property. In one example, the polymeric film comprises polyethylene terephthalate (PET). Polyethylene terephthalate films are used in commercially available susceptors, for example, the QWIKWAVE® Focus susceptor and the MICRORITE® susceptor, both available from Graphic Packaging International (Marietta, Ga.). Examples of polyethylene terephthalate films that may be suitable for use as the substrate include, but are not limited to, MELINEX®, commercially available from DuPont Teijan Films (Hopewell, Va.), SKYROL, commercially available from SKC, Inc. (Covington, Ga.), and BARRIALOX PET, commercially available from Toray Films (Front Royal, Va.), and QU50 High Barrier Coated PET, available from Toray Films (Front Royal, Va.).

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item.

For example, the microwave energy interactive material may be provided as a continuous or discontinuous layer or coating including circles, loops, hexagons, islands, squares, rectangles, octagons, and so forth. Examples of various patterns and methods that may be suitable for use with the present invention are provided in U.S. Pat. Nos. 6,765,182; 6,717,121; 6,677,563; 6,552,315; 6,455,827; 6,433,322; 6,414,290; 6,251,451; 6,204,492; 6,150,646; 6,114,679; 5,800,724; 5,759,422; 5,672,407; 5,628,921; 5,519,195; 5,424,517; 5,410,135; 5,354,973; 5,340,436; 5,266,386; 5,260,537; 5,221,419; 5,213,902; 5,117,078; 5,039,364; 4,963,424; 4,936,935; 4,890,439; 4,775,711; 4,865,921; and Re. 34,683. each of which is incorporated by reference herein in its entirety. Although particular examples of patterns of microwave energy interactive material are shown and described herein, it should be understood that other patterns of microwave energy interactive material are contemplated by the present invention.

Figure 1E:
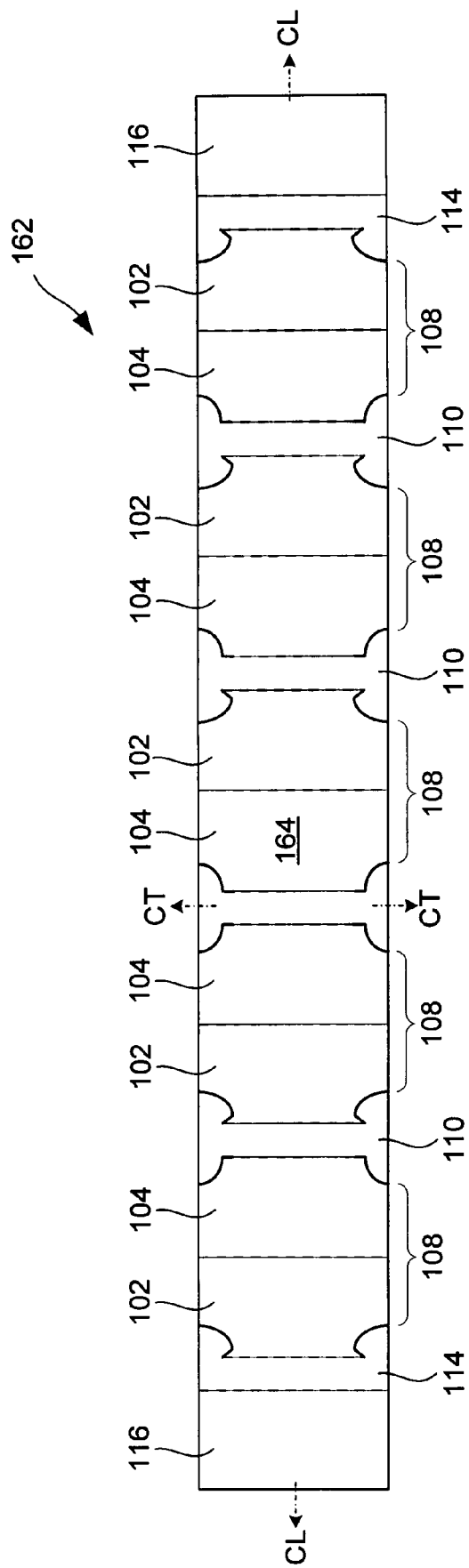
FIG. 1E is a plan view of the blank of FIG. 1A, with a microwave energy interactive element, according to various aspects of the invention.
Figure 1F:
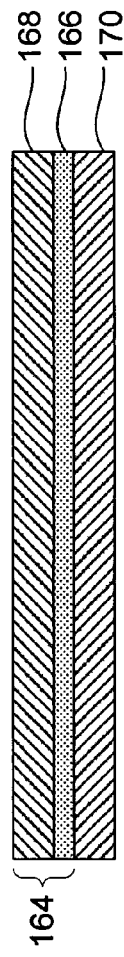
FIG. 1F is a schematic, partial cross-sectional view of the blank of FIG. 1E.

By way of example, and not limitation, FIG. 1E illustrates a blank 162 similar to the blank 100 of FIG. 1A, except that the blank 162 of FIG. 1E includes a microwave energy interactive element 164 overlying substantially all of the various panels. In this example, the microwave energy interactive element 164 comprises a susceptor and, more particularly, comprises a susceptor film including a microwave energy interactive material 166 supported on a polymer film 168, as shown schematic cross-sectional view of FIG. 1F. The layer of microwave energy interactive material 166 is disposed between the polymer film 168 and the paperboard support 170 that forms the various panels of the blank 162. The susceptor film 164 may be joined to the support in any suitable manner, for example, using a continuous or patterned layer of adhesive (not shown). However, other microwave energy interactive elements are contemplated hereby.

A construct may be formed from the blank 162 in the manner described above, and would be similar to that of FIG. 1D, except that the microwave energy interactive element 164, in this example, a susceptor, would overlie the food-contacting side of the various panels.

To use the construct erected from the blank, one or more food items may be loaded into the construct and, optionally, placed within an outer container, as generally shown in FIG. 1D. The food items may remain in this condition prior to consumption. When the food item or items are ready to be heated the construct, optionally within an outer container, may be placed within a microwave oven (not shown). During the heating cycle, the food items remain in proximate and/or intimate contact with the susceptor. The susceptor converts microwave energy to thermal energy, which then may be transferred to the adjacent food item. As a result, the heating, browning, and/or crisping of the food item or items may be enhanced.

If desired, the inner surface of the container also may include one or more microwave energy interactive elements (not shown) to enhance further, or otherwise alter, the effect of microwave oven on the food items.

Any of the numerous microwave interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The number, shape, size, and positioning of such breaks or apertures may vary for a particular application depending on type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void in the material used to form the blank or construct, or may be a non-physical "aperture" or discontinuity. A non-physical aperture may be a portion of the blank or construct that is microwave energy inactive by deactivation or otherwise, or one that is otherwise transparent to microwave energy. Thus, for example, the aperture may be a portion of the blank or construct formed without a microwave energy active material or, alternatively, may be a portion of the blank or construct formed with a microwave energy active material that has been removed or deactivated. While both physical and non-physical apertures or discontinuities allow the food item to be heated directly by the microwave energy, a physical aperture also provides a venting function to allow steam or other vapors to be released and carried away from the food item.

Figure 1G:
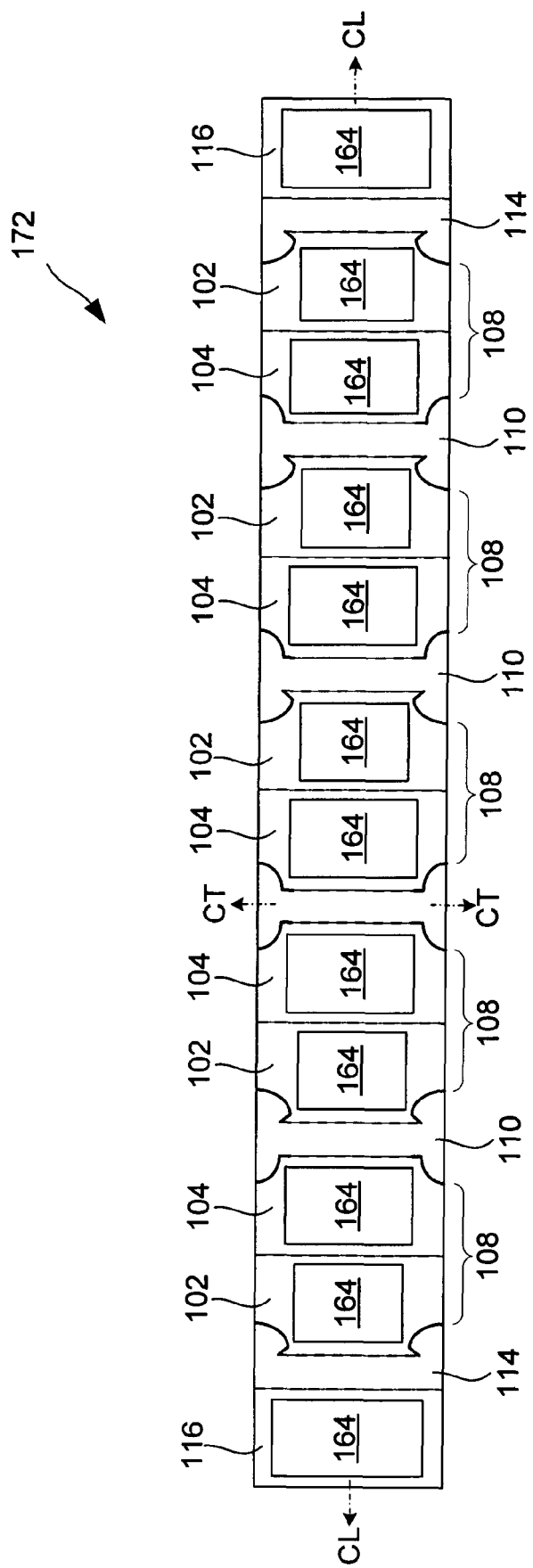
FIG. 1G is a plan view of the blank of FIG. 1A, with a plurality of microwave energy interactive elements, according to various aspects of the invention.

It also may be beneficial to create one or more discontinuities or inactive regions to prevent overheating or charring of the construct. By way of example, and not limitation, in the blank 162 illustrated in FIG. 1E, the concentration of heat generated along the edges of adjacent panels, for example, panels 102 and 104, may be sufficient to cause the underlying support, for example, paperboard, to become scorched. As such, the peripheral portions of one or more of panels 102, 104, and/or 110 may be designed to be microwave inactive, for example, by forming these areas without a microwave energy interactive material or by deactivating the microwave energy interactive material in these areas. Further still, one or more panels, portions of panels, or portions of the construct may be designed to be microwave energy inactive to ensure that the microwave energy is focused efficiently on the areas to be browned and/or crisped, rather than being lost to portions of the food item not intended to be browned and/or crisped or to the heating environment. For example, in the exemplary blank 172 shown in FIG. 1G, a plurality of microwave energy interactive elements 164, for example, microwave energy interactive susceptor "patches" of varying size, overlie a non-peripheral portion of each of panels 102 and 104, but do not overlie panels 110. Numerous other configurations are contemplated by the invention.

Figure 2:
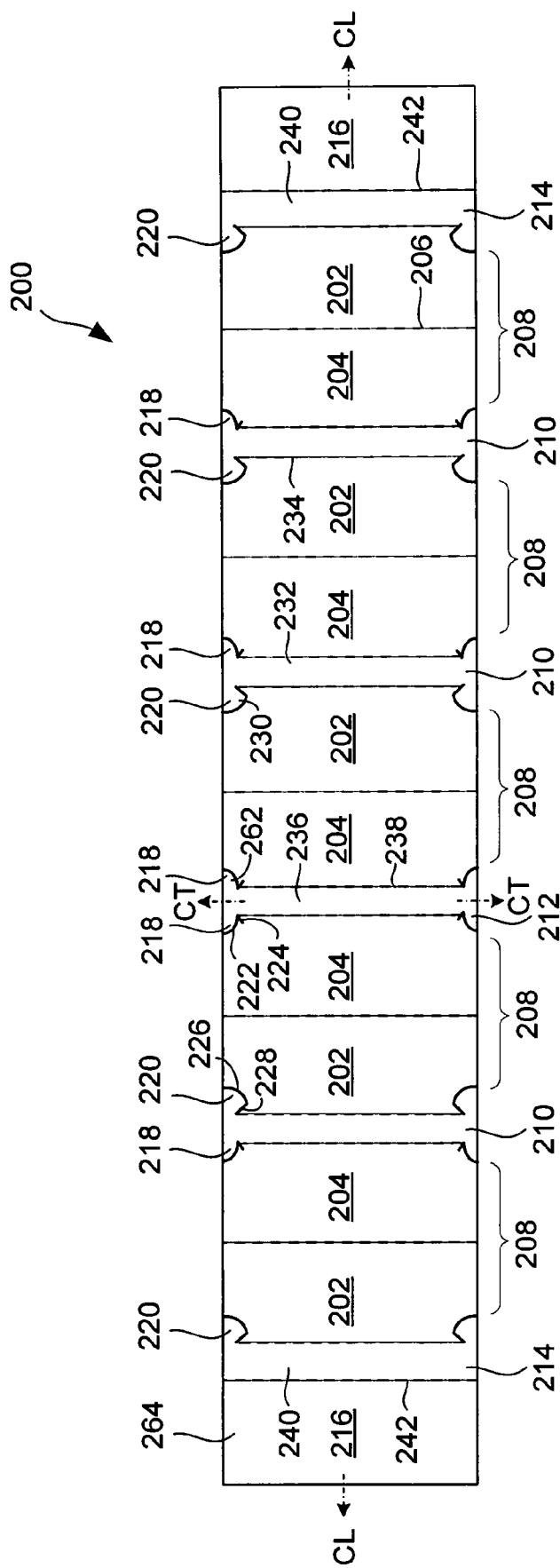
FIG. 2 is a plan view of another exemplary blank according to the various aspects of the invention.

FIG. 2 illustrates another exemplary blank 200 according to various aspects of the invention. The blank 200 may be substantially similar to the blank 100 illustrated in FIG. 1A, with similar or identical elements to those of FIG. 1A being preceded by a "2" instead of a "1". The blank 200 may be wholly or partially symmetrical about a longitudinal center line CL.

Referring to FIG. 2, the blank 200 is an elongate strip comprising a plurality of first and second separator panels 202, 204 foldably connected along transverse spine fold lines 206. The separator panels 202, 204 are arranged in pairs 208 that form divider walls in the erected construct (not shown). The exemplary blank 200 includes five panel pairs 208, with adjacent panel pairs 208 connected to one another at base panels 210 or 212. A distal base panel 214 is foldably connected to a panel pair 208 at each end of the blank 200. An end panel 216 may be foldably connected at each end of the blank 200.

The second locking features 220 of FIG. 2 may be substantially identical to the second locking features 120 illustrated in FIG. 1A. The first locking features 218 may be similar to the locking features 118 illustrated in FIG. 1A, except that cut 224 extending from an end of each of the curved cuts 222 is an oblique cut. Oblique cuts 224 and curved cuts 222 define locking projections 262 that engage corresponding locking projections 230 in the second locking features 220 to secure adjacent base panels. A microwave energy interactive element 264, for example, a susceptor, may overlie all or a portion of the blank 200.

The blank 200 may be erected into a construct and used in the manner described above with reference to FIGS. 1A-1G. Further, the construct may be used with a carton or other container as described above to contain, heat, brown, and/or crisp one or more food items, as described in connection with FIG. 1D.

Figure 3A:
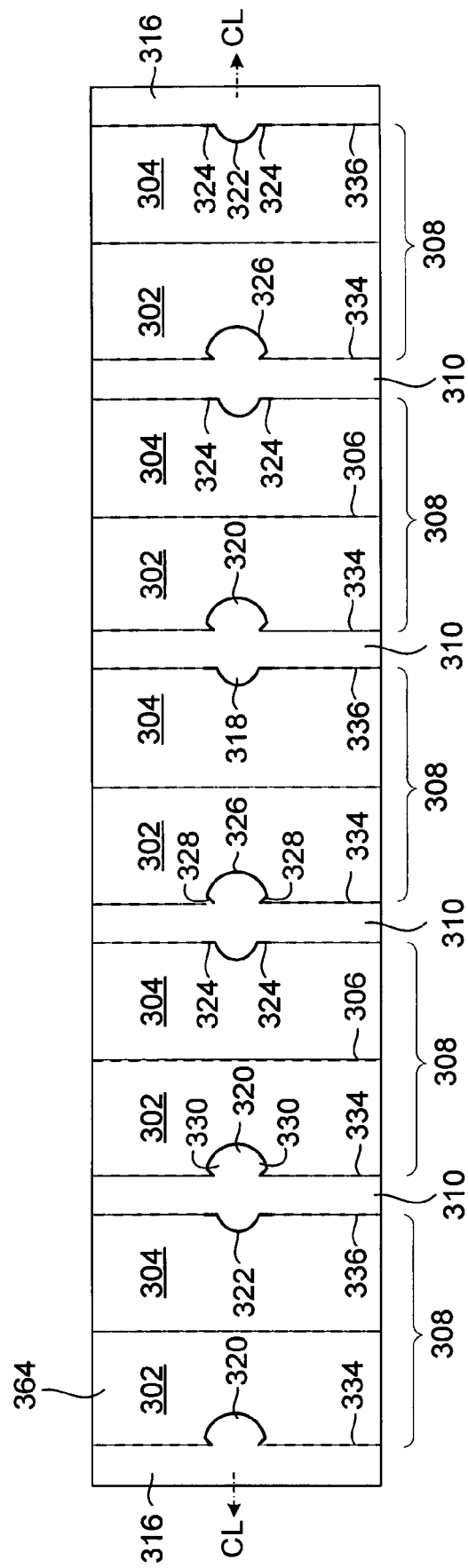
FIG. 3A is a plan view of yet another exemplary blank according to various aspects of the invention.

FIG. 3A illustrates yet another exemplary blank 300 according to another aspect of the invention. The blank 300 may be substantially similar to the blank 100 illustrated in FIG. 1A, with similar or identical elements to those of FIG. 1A being preceded by a "3" instead of a "1". The blank 300 may be wholly or partially symmetrical about a longitudinal center line CL.

Referring to FIG. 3A, the blank 300 is a generally elongate strip comprising a plurality of first and second separator panels 302, 304 foldably connected along transverse spine fold lines 306. The separator panels 302, 304 are arranged in pairs 308 that form divider walls 346 in the erected construct 344 (FIG. 3C). In this example, blank 300 includes five panel pairs 308, with adjacent separator panel pairs 308 connected to one another by base panels 310. If desired, fewer or additional panel pairs 308 can be included depending upon the number of food items to be stored and/or heated within the construct 344. A distal base panel 316 is foldably connected to a panel pair 308 at each end of the blank 300.

The base panels 310 are generally rectangular elongate sections having a first locking feature 318 at one side and a second locking feature 320 at a second side of each panel 310. Each first locking feature 318 is defined by a curved or arcuate cut 322 that may be substantially coterminous with transverse cuts 324 extending from each end of cut 322. Each second locking feature 320 is defined by a curved or arcuate cut 326 and an oblique cut 328 extending inwardly from each end of the curved cut 326. Arcuate cut 326 and oblique cuts 328 define locking projections 330 on each side of the second locking feature 320. In FIG. 3A, the locking features 318, 320 are illustrated as arranged along a longitudinal center line CL of the blank 300. However, any interior location in the blank 300 remote from the edges may be suitable for the locking features 318, 320.

Base panels 310 are foldably connected to adjacent first separator panels 302 along transverse fold lines 334, which are interrupted by the second locking features 320. Similarly, base panels 310 are foldably connected to adjacent second separator panels 304 along transverse fold lines 336, which are interrupted by the first locking features 336.

A microwave energy interactive element 364, for example, a susceptor, may overlie all or a portion of the blank 300.

Figure 3B:
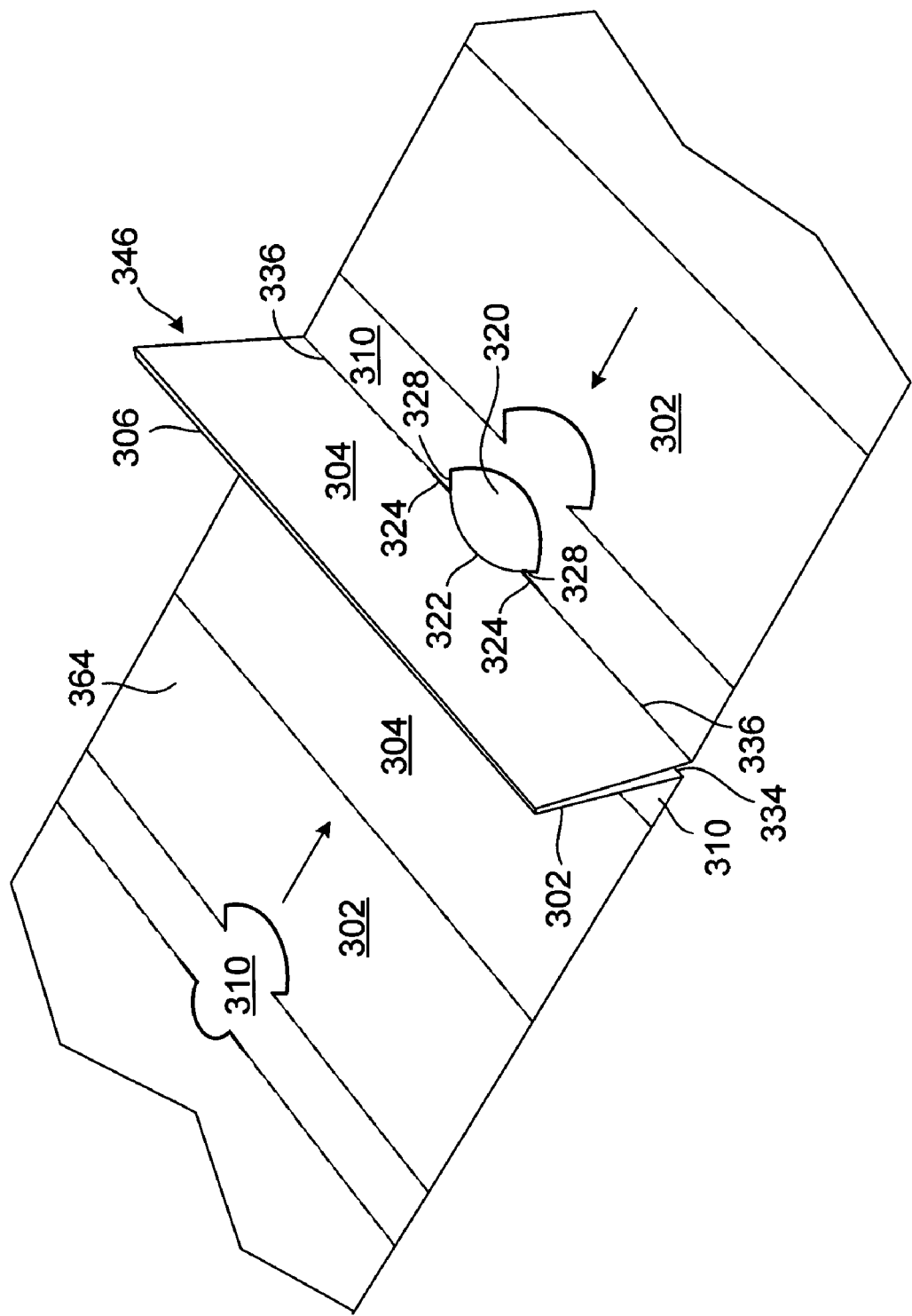
FIG. 3B illustrates a portion of the blank of FIG. 3A, partially erected into a construct.
Figure 3C:
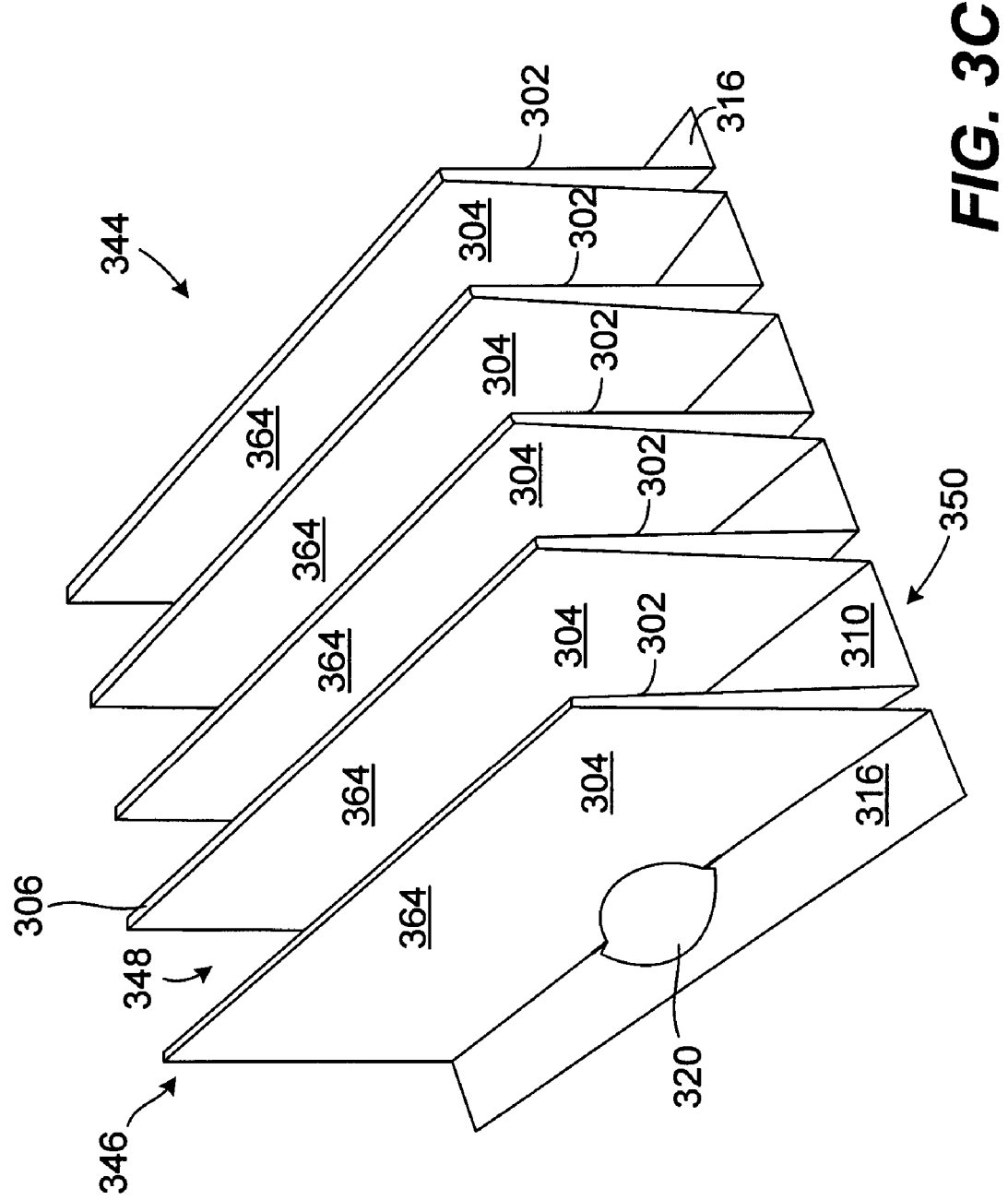
FIG. 3C illustrates an exemplary construct erected from the blank of FIG. 3A, according to various aspects of the invention.

One exemplary method of erecting a construct 344 from the blank 300 is illustrated in FIGS. 3B and 3C. As shown in FIG. 3B, adjacent base panels 310 are advanced toward one another in the direction of the arrows so that the blank 300 folds along transverse fold lines 334, 336. At the same time, separator panels 302, 304 fold with respect to one another along transverse spine fold line 306.

As the adjacent base panels 310 are brought toward one another, the first locking feature 318 and the second locking feature 320 are struck from respective separator panels 304 and 302, and the second locking feature 320 slides through an aperture defined by cuts 322 and 324. The locking projections 330 of the second locking feature 320 maintain the base panels 310 in the overlapping, interlocked position shown in FIG. 3B with locking feature 320 overlying locking feature 318 (hidden from view). In this configuration, the separator panels 302, 304 form a vertical or generally upright separator wall 346. In the same manner, additional separator walls 346 may be formed from the other separator panel pairs 308 of the blank 300.

FIG. 3C illustrates an exemplary construct 344 formed from the blank 300 of FIG. 3A. The separator walls 346 form a series of receptacle slots 348 in which food items (not illustrated) may be received. The interlocked base panels 310 of the blank 300 form a base 350 of the construct 344. If desired, the construct 344 can be placed in an a carton or other container prior to shipping, as described in connection with FIG. 1C. Notably, the construct 344 can be erected from the blank 300 without requiring the use of adhesives and, if desired, can be shipped flat by folding the separator walls 346 towards the base 350. The construct 344 may be used in the manner described above to store, heat, brown, and/or crisp various food items therein.

Figure 4A:
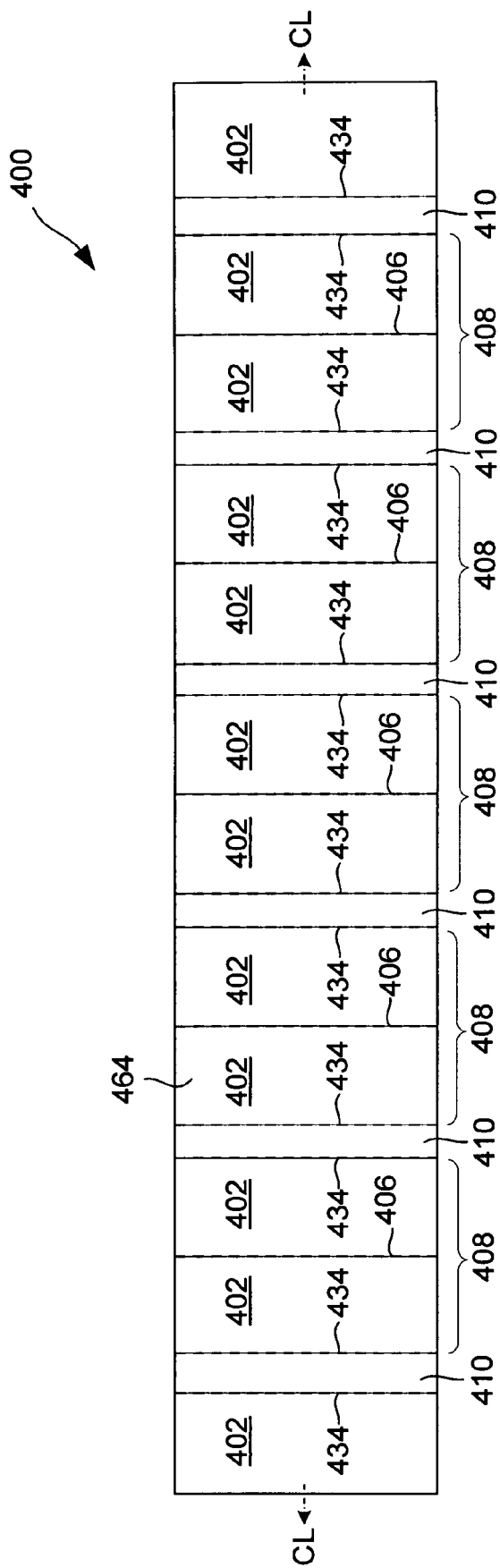
FIG. 4A is a plan view of still another exemplary blank according to various aspects of the invention.
Figure 4B:
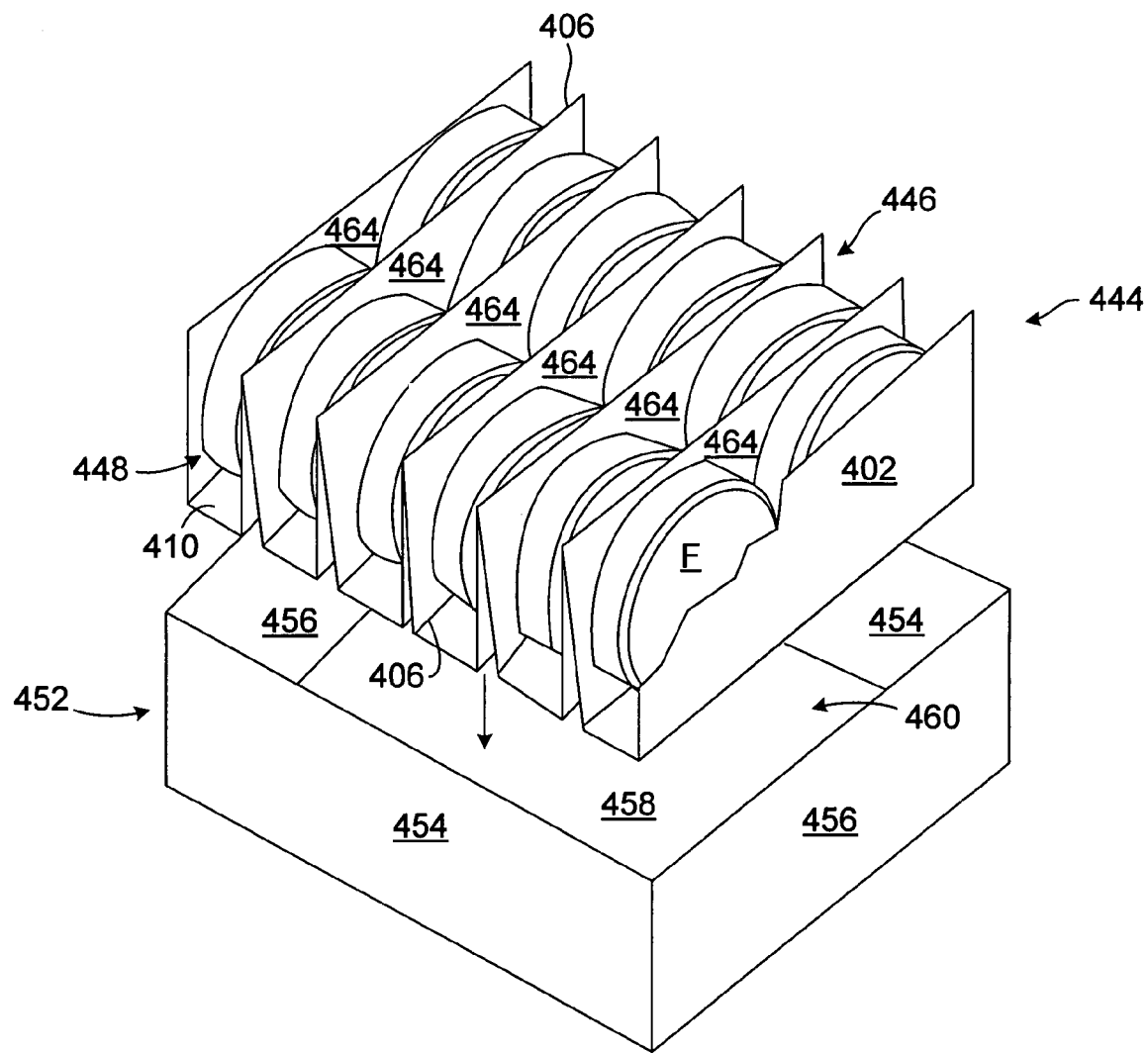
FIG. 4B illustrates an exemplary construct erected from the blank of FIG. 4A in an exploded configuration with respect to an outer carton, according to various aspects of the invention.

FIG. 4A illustrates still another exemplary blank 400 according to various aspects of the invention. The blank 400 may be used to form a construct, for example, the construct 444 illustrated in FIG. 4B. The blank 400 may be substantially similar to the blank 100 illustrated in FIG. 1A, with similar or identical elements to those of FIG. 1A being preceded by a "4" instead of a "1". The blank 400 may be wholly or partially symmetrical about a longitudinal center line CL.

Referring to FIG. 4A, the blank 400 is a generally elongate strip comprising a plurality of first and second separator panels 402 foldably connected along transverse spine fold lines 406. The separator panels 402 are arranged in pairs 408 that form divider walls 446 in a construct 444 (FIG. 4B) erected from the blank 400. The exemplary blank 400 includes five separator panel pairs 408, with adjacent panel pairs 408 connected to one another by base panels 410 along transverse fold lines 434. However, fewer or additional separator panel pairs 408 can be included depending upon the number of food items to be heated by the construct 444. The separator panels 402 and base panels 410 are generally rectangular in shape.

A microwave energy interactive element 464, for example, a susceptor, may overlie all or a portion of the blank 400.

To form a construct 444 from the blank 400, the ends of the blank 400 are urged towards one another so that adjacent separator panels 402 fold toward one another along transverse spine fold lines 406. At the same time, the blank 400 folds along transverse fold lines 434 so that the separator panels 402 assume the generally upright positions shown in FIG. 4B. In this configuration, separator panel pairs 408 are upright and form separator walls 446 that define a plurality of receptacle slots 448 in which food items F are received. Notably, and in accordance with one aspect of the invention, the construct 444 can be erected from the blank 400 without the use of glue or other adhesives. According to another aspect, after the construct 444 is erected, the separator walls 446 can be folded over so that the construct can be shipped flat.

If desired, the construct may be placed into a carton 452, which may be dimensioned to assist with retaining the shape of the construct 444 in an erected configuration. The construct 444 may be used in the manner described in connection with the various constructs above.

Figure 5A:
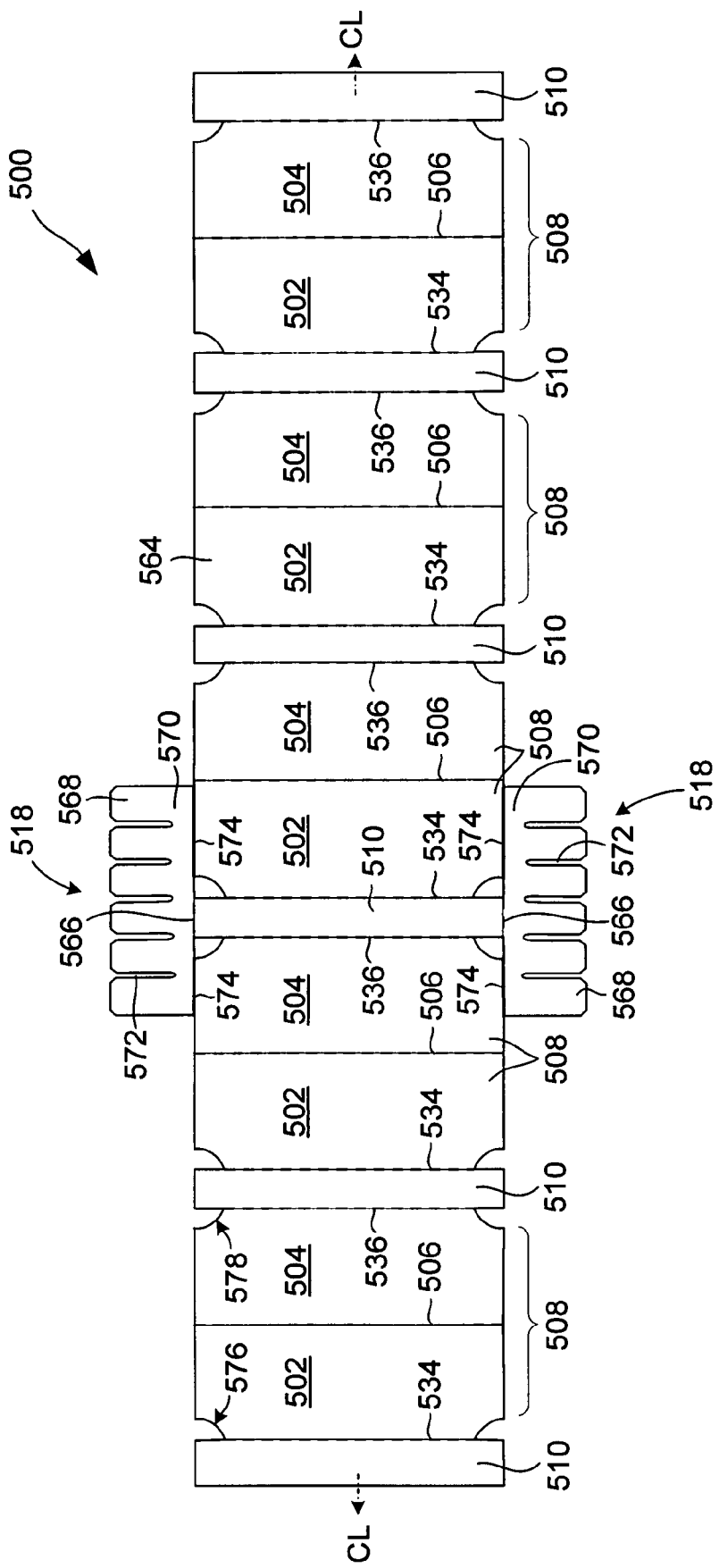
FIG. 5A is a plan view of another exemplary blank according to various aspects of the invention.
Figure 5B:
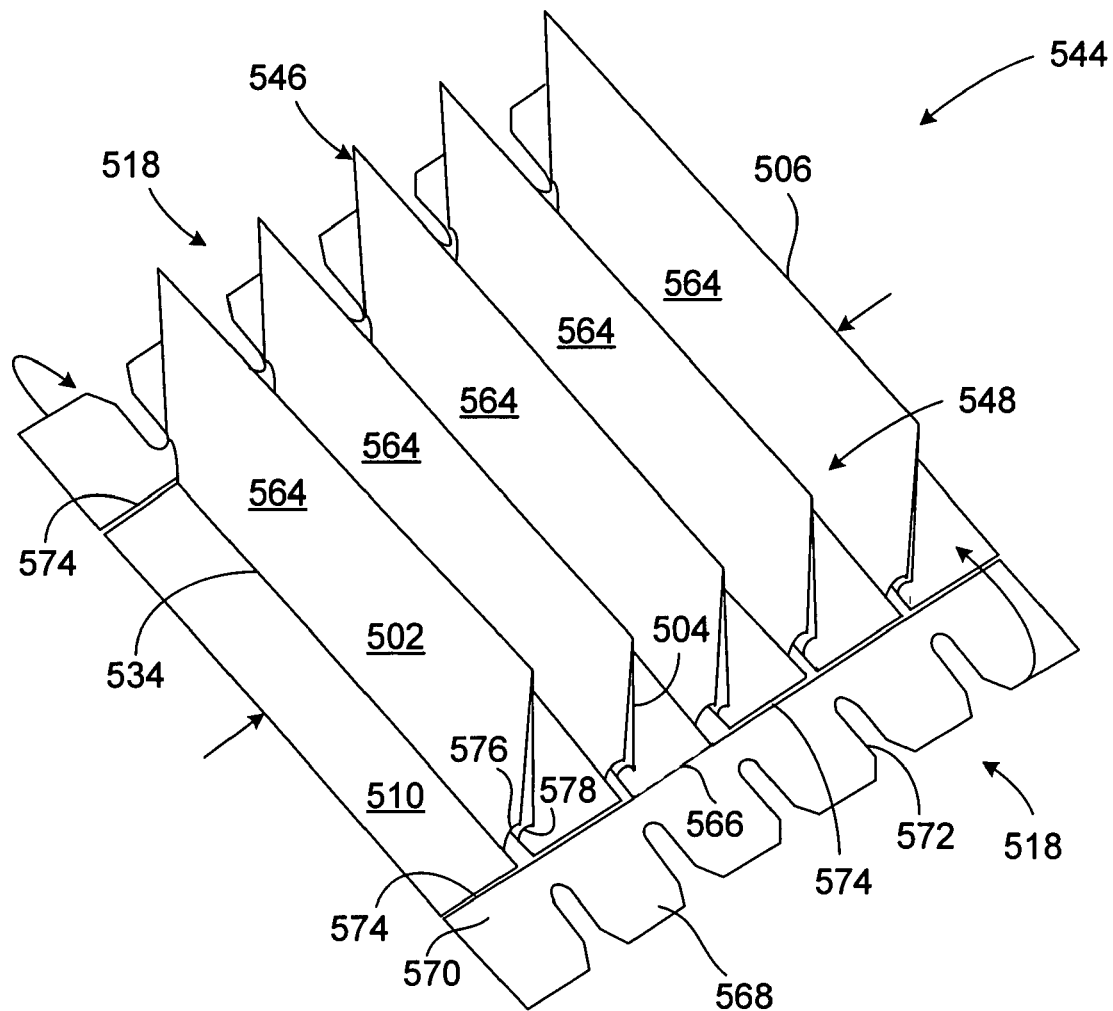
FIG. 5B illustrates the blank of FIG. 5A, partially erected into a construct.
Figure 5C:
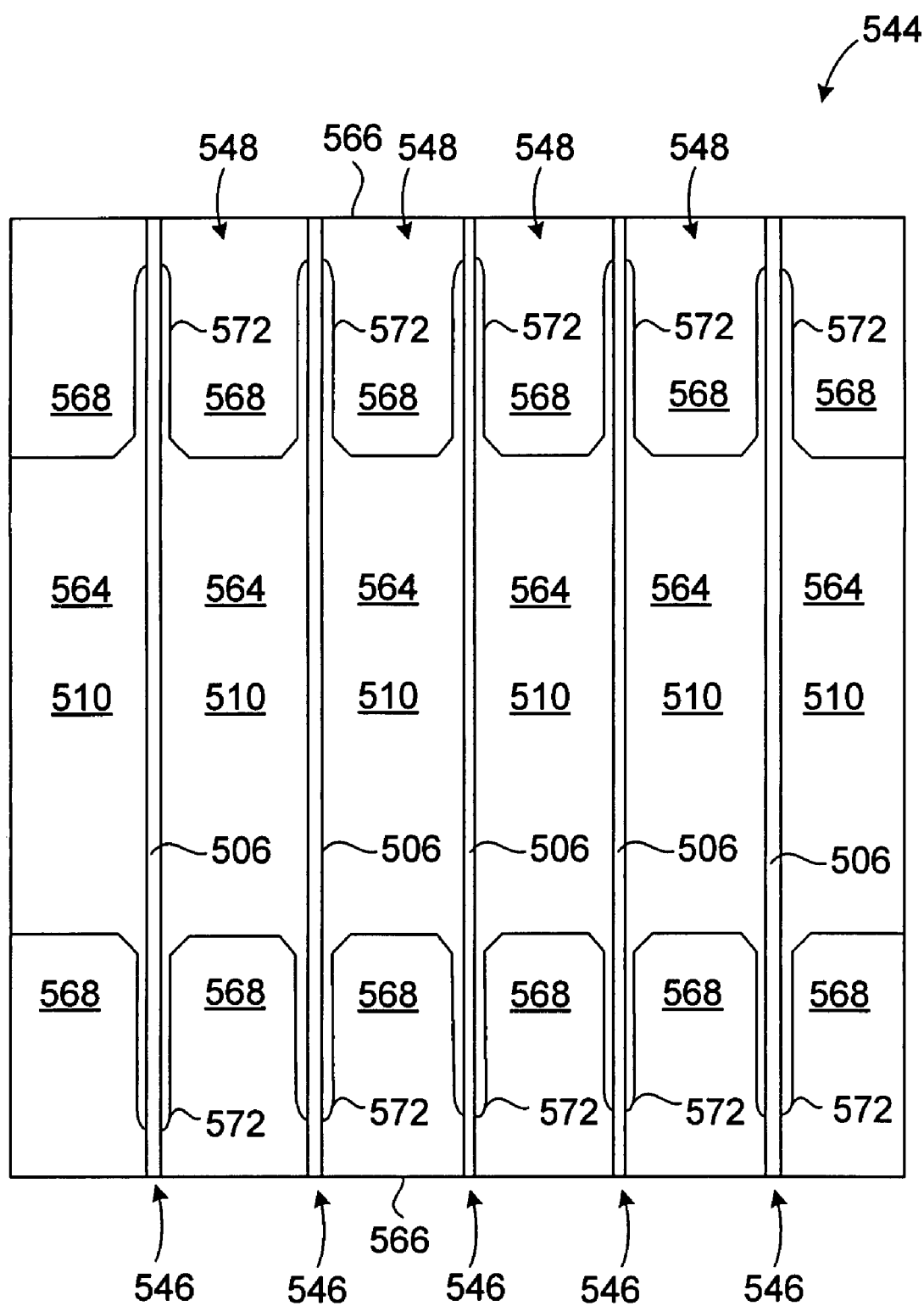
FIG. 5C is a top plan view of an exemplary construct erected from the blank of FIG. 5A, according to various aspects of the invention.

FIG. 5A illustrates yet another exemplary blank 500 according to various aspects of the invention. The blank 500 may be wholly or partially symmetrical about a longitudinal center line CL. The blank 500 is a generally elongate strip comprising a plurality of first and second separator panels 502, 504 foldably connected along transverse spine fold lines 506. The separator panels 502, 504 are arranged in separator panel pairs 508 that form divider walls 546 in a construct 544 erected from the blank 500 (FIG. 5C). The exemplary blank 500 includes five separator panel pairs 508, with adjacent panel pairs 508 connected to one another at base panels 510. However, fewer or additional separator panel pairs 508 can be included depending upon the number of food items to be stored and/or heated within the construct 544.

Base panels 510 are elongate, generally rectangular sections foldably connected to adjacent first separator panels 502 along transverse fold lines 534, and foldably connected to adjacent second separator panels 504 along transverse fold lines 536.

A locking feature 518 is located at an upper and a lower marginal area of the blank 500. The locking features 518 are each foldably connected to each end of one of the base panels 510 along a longitudinal fold line 566. Each locking feature 518 includes a plurality of locking projections 568 extending from a base 570. The locking projections 568 are separated from one another by elongated clearance apertures 572. The base 570 of each locking feature 518 is separated from the respective adjacent separator panel 502, 504 by longitudinal cuts 574. Clearance cutouts 576, 578 are formed in the separator panels 502, 504. The clearance cutouts 576, 578 allow the locking features 518 to be folded inwardly about the fold lines 566, as will be discussed further below with reference to FIG. 5B.

A microwave energy interactive element 564, for example, a susceptor, may overlie all or a portion of the blank 500.

To form a construct 544 from the blank 500, the ends of the blank 500 are urged together so that adjacent separator panels 502, 504 fold toward one another along fold lines 506, 534, and 536. In doing so, separator panels 502, 504 assume generally upright positions and form separator walls 546, as shown in FIG. 5B. Locking features 518 are then folded 180 degrees inwardly about the longitudinal fold lines 566 in the direction of the curved arrows until the locking features 518 are folded flat as shown in FIG. 5C. The clearance cutouts 576, 578 in the separator panels 502, 504 allow the bases 570 of the locking features 518 to fold over without interfering with the remainder of the construct. The upright separator walls 546 pass through the clearance apertures 572 in the locking features 518.

The separator walls 546 form a plurality of receptacle slots 548 in which food items (not illustrated) may be received. The construct 544 can be erected from the blank 500 without the use of glue or other adhesives. The construct can be used in the manner described above with respect to the various other constructs of the invention to contain and, optionally, heat, brown, and/or crisp one or more food items in a microwave oven.

It will be understood that in some circumstances, particularly where the food item has an irregular surface that is difficult to brown and/or crisp, the blank, construct, and/or outer carton may include a microwave energy interactive element comprising a microwave energy interactive insulating material. As used herein, the term "microwave energy interactive insulating material" or "microwave energy interactive insulating structure" or "insulating material" or "insulating structure" refers any combination of layers of materials, for example, paper layers, polymer film layers, and microwave energy interactive elements, that is both responsive to microwave energy and capable of providing some degree of thermal insulation when used to heat a food item. The insulating material may overlie all or a portion of the various food-contacting areas of the various blanks, constructs, and/or cartons, for example, in place of the susceptors shown in the various figures. However, other locations for the insulating material are contemplated hereby.

The insulating material may include various components, provided that each is resistant to softening, scorching, combusting, or degrading at typical microwave oven heating temperatures, for example, at from about 250° F. to about 425° F. The insulating material may include both microwave energy responsive or interactive components, and microwave energy transparent or inactive components.

In one aspect, the insulating material comprises one or more susceptor layers in combination with one or more expandable insulating cells. Such materials may be referred to as "expandable cell insulating materials". Additionally, the insulating material may include one or more microwave energy transparent or inactive materials to provide dimensional stability, to improve ease of handling the microwave energy interactive material, and/or to prevent contact between the microwave energy interactive material and the food item. For example, an insulating material may comprise a microwave energy interactive material supported on a first polymeric film layer, a moisture-containing layer superposed with the microwave energy interactive material and a second polymeric film layer joined to the moisture-containing layer in a predetermined pattern, thereby forming one or more closed cells between the moisture-containing layer and the second polymeric film layer. The closed cells expand or inflate in response to being exposed to microwave energy, and thereby causing microwave energy interactive material to bulge and deform.

Several exemplary insulating materials are depicted in FIGS. 6A-10. In each of the examples shown herein, it should be understood that the layer widths are not necessarily shown in perspective. By way of example, some layers may be very thin with respect to other layers, but are nonetheless shown with some thickness for purposes of clearly illustrating the arrangement of layers.

Figure 6A:
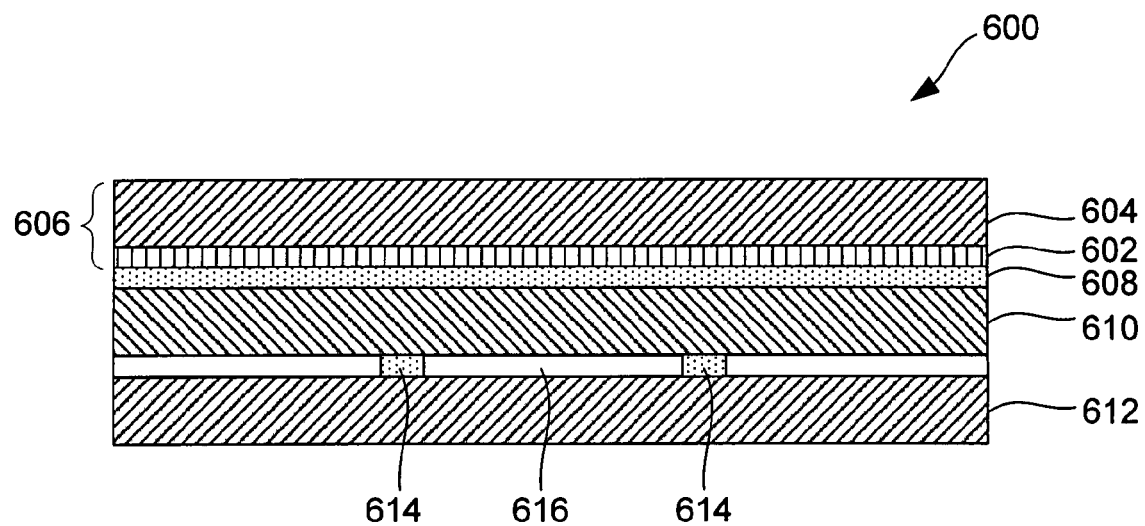
FIG. 6A is a schematic cross-sectional view of an exemplary microwave energy interactive insulating material that may be used in accordance with the invention.
Figure 6B:
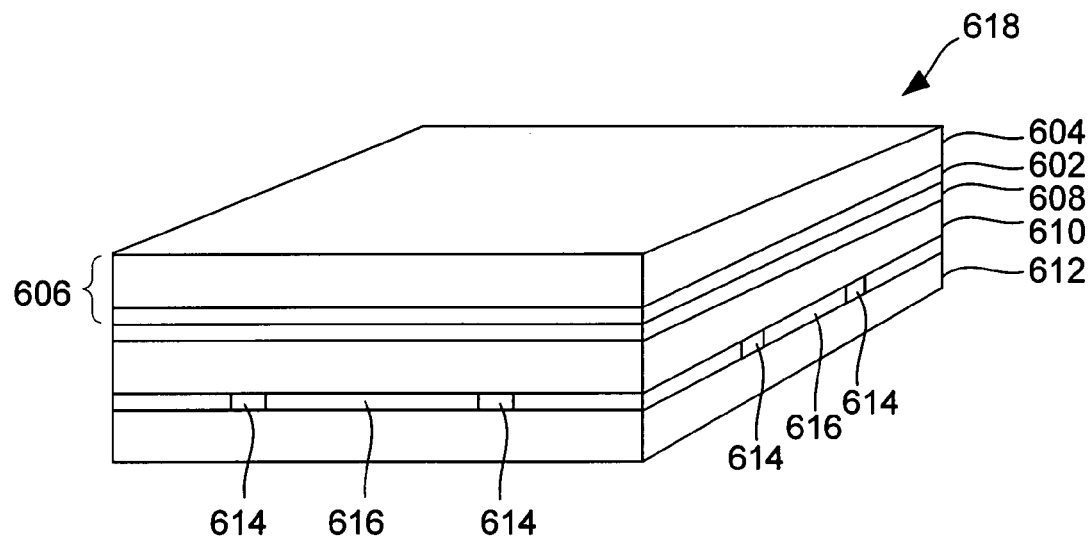
FIG. 6B is a schematic perspective view of the insulating material of FIG. 6A, in the form of a cut sheet.

FIG. 6A depicts an exemplary insulating structure or material 600 that may be used in accordance with the invention. In this example, a thin layer of microwave energy interactive material 602 is supported on a first polymer film 604 (collectively comprising susceptor 606) and bonded by lamination with an adhesive 608 (or otherwise) to a dimensionally stable substrate 610, for example, paper. The substrate 610 is bonded to a second polymer film 612 using a patterned adhesive 614 or other material, such that closed, expandable cells 616 (each shown as a void) are formed in the material 600. The insulating material 600 may be cut and provided as a substantially flat, multi-layered sheet 618, as shown in FIG. 6B.

Figure 6C:
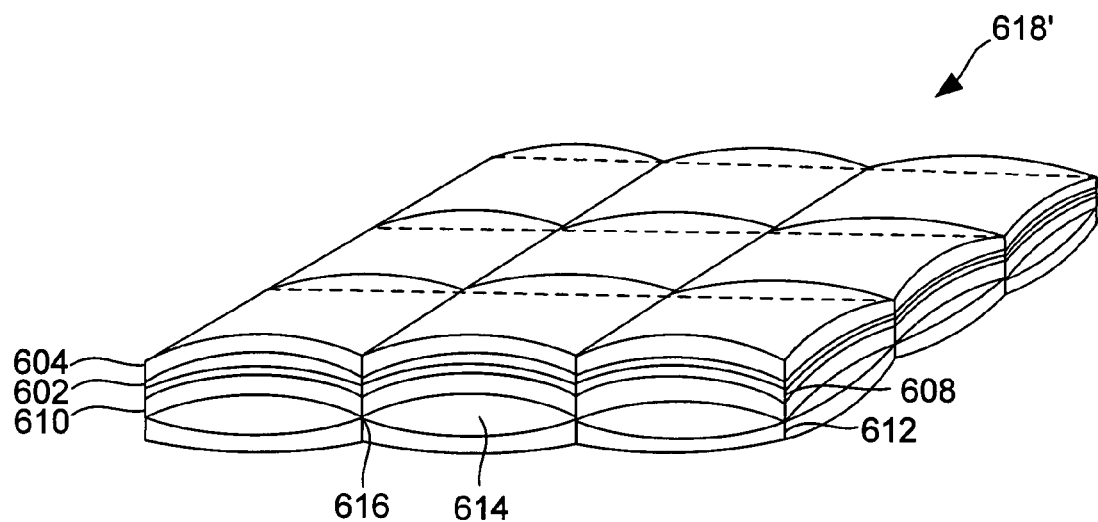
FIG. 6C is a schematic perspective view of the insulating material of FIG. 6B, during exposure to microwave energy.

As the microwave energy interactive material 602 heats upon impingement by microwave energy, water vapor and other gases typically held in the substrate 610, for example, paper, and any air trapped in the thin space between the second polymer film 612 and the substrate 610 in the closed cells 616, expand, as shown in FIG. 6C. The resulting insulating material 618' has a quilted or pillowed top surface 620 and bottom surface 622. When microwave heating has ceased, the cells 626 typically deflate and return to a somewhat flattened state.

Figure 7:
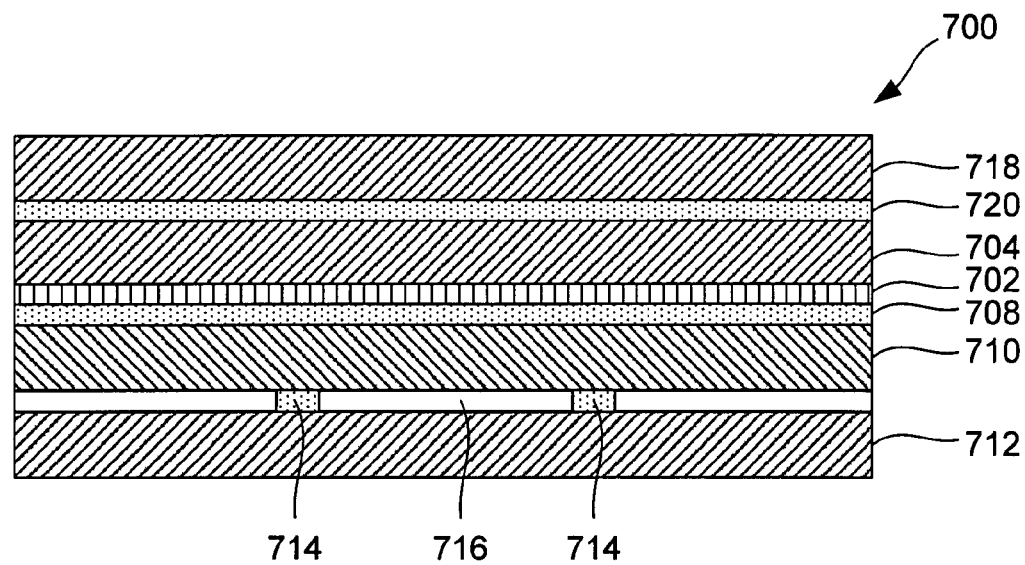
FIG. 7 is a schematic cross-sectional view of another exemplary microwave energy interactive insulating material that may be used in accordance with the invention.

FIG. 7 illustrates another exemplary microwave energy interactive insulating structure or material 700 that may be used in accordance with the invention. Much like the structure 600 illustrated in FIG. 6A, the structure 700 of FIG. 7 includes a thin layer of microwave energy interactive material 702 supported on a first polymer film 704, which collectively comprises susceptor 706. Susceptor 706 is bonded by lamination with an adhesive 708 or otherwise to a dimensionally stable substrate 710, for example, paper, which in turn, is bonded to a second polymer film 712 using a patterned adhesive 714 or other material to form a plurality of closed, expandable cells 716 (each shown as a void). In this example, however, the structure 700 includes an additional layer of paper 718 joined to the remainder of the structure using a layer of adhesive 720 or other suitable material to provide additional dimensional stability and to prevent any flaking of the microwave energy interactive material 702 from the structure 700.

Figure 8:
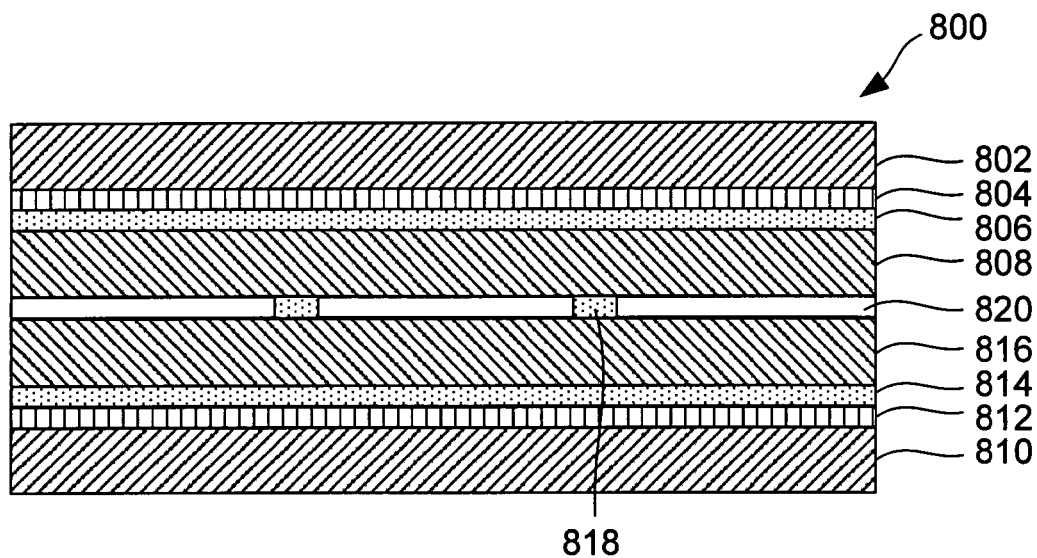
FIG. 8 is a schematic cross-sectional view of yet another exemplary microwave energy interactive insulating material that may be used in accordance with the invention.

FIG. 8 depicts yet another exemplary insulating structure or material 800 that may be used in accordance with the invention. The material 800 includes two symmetrical layer arrangements adhered together by a patterned adhesive layer. The first symmetrical layer arrangement, beginning at the top of the drawings, comprises a polymer film layer 802, for example, polyethylene terephthalate, a metal layer 804, an adhesive layer 806, and a paper or paperboard layer 808. The metal layer 804 may comprise a metal, such as aluminum, deposited along at least a portion of the polymer film layer 802. The polymer film layer 802 and metal layer 804 together define a susceptor. The adhesive layer 806 bonds the polymer film layer 802 and the metal layer 804 to the paperboard layer 808.

The second symmetrical layer arrangement, beginning at the bottom of the drawings, also comprises a polymer film layer 810, a metal layer 812, an adhesive layer 814, and a paper or paperboard layer 816. If desired, the two symmetrical arrangements may be formed by folding one layer arrangement onto itself. The layers of the second symmetrical layer arrangement are bonded together in a similar manner as the layers of the first symmetrical arrangement. A patterned adhesive layer 818 is provided between the two paper layers 808 and 816, and defines a pattern of closed cells 820 (each shown as a void) configured to expand when exposed to microwave energy. By using an insulating material 800 having two metal layers 804 and 812, more heat is generated, thereby achieving greater cell loft. As a result, such a material is able to elevate a food item seated thereon to a greater extent than an insulating material having a single microwave energy interactive material layer.

Figure 9:
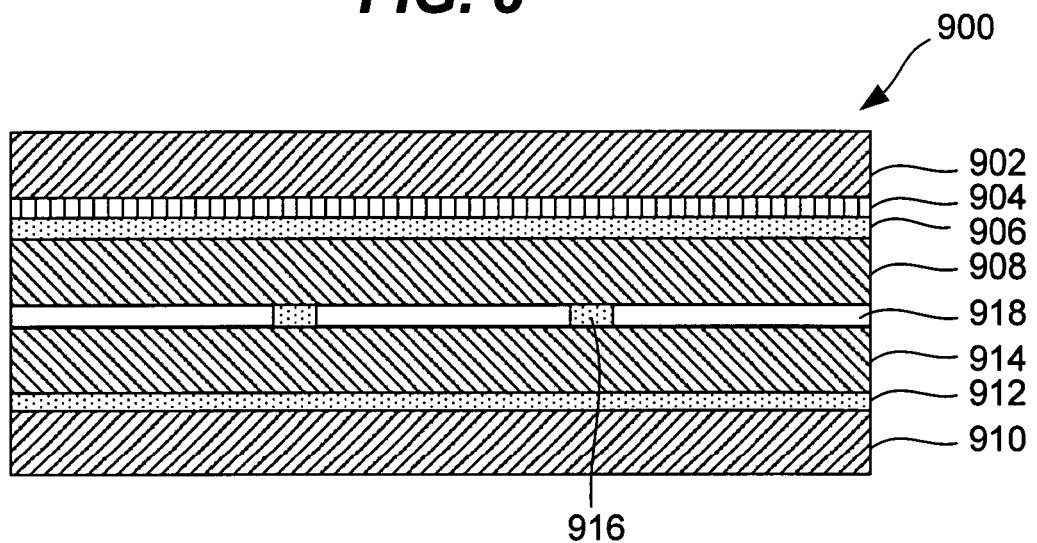
FIG. 9 is a schematic cross-sectional view of still another exemplary microwave energy interactive insulating material that may be used in accordance with the invention.

Now viewing FIG. 9, yet another insulating material 900 is shown. The material 900 includes a polymer film layer 902, a metal layer 904, an adhesive layer 906, and a paper layer 908. Additionally, the material 900 may include a second polymer film layer 910, an adhesive 912, and a paper layer 914. The layers are adhered or affixed by a patterned adhesive 916 to define a plurality of closed expandable cells 918 (each shown as a void).

Figure 10:
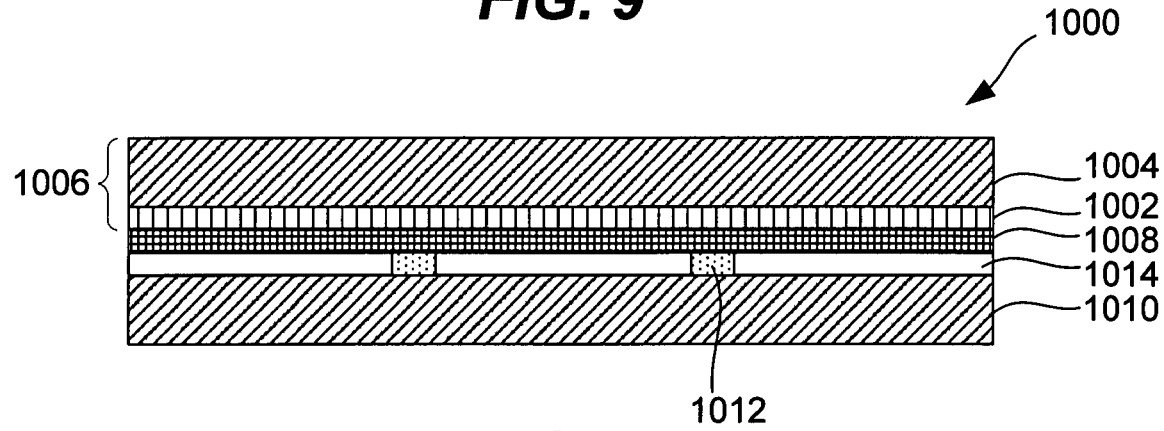
FIG. 10 is a schematic cross-sectional view of another exemplary microwave energy interactive insulating material that may be used in accordance with the invention.

FIG. 10 depicts yet another exemplary insulating material 1000. In this example, one or more reagents are used to generate a gas that expands the cells of the insulating material. In the example shown in FIG. 10, a thin layer of microwave interactive material 1002 is supported on a first polymer film 1004 to form a susceptor film 1006. One or more reagents 1008, optionally within a coating, overlie at least a portion of the layer of microwave interactive material 1002. The reagent 1008 is joined to a second polymer film 1010 using a patterned adhesive 1012 or other material, or using thermal bonding, ultrasonic bonding, or any other suitable technique, such that closed cells 1014 (each shown as a void) are formed in the material 1000.

As the microwave interactive material 1002 heats upon impingement by microwave energy, water vapor or other gases are released from or generated by the reagent 1008. The resulting gas applies pressure on the susceptor film 1006 on one side and the second polymer film 1010 on the other side of the closed cells 1014. Each side of the material 1000 forming the closed cells 1014 reacts simultaneously, but uniquely, to the heating and vapor expansion to form a quilted insulating material (not shown, but similar in appearance to that of FIG. 6C). This expansion may occur within 1 to 15 seconds in an energized microwave oven, and in some instances, may occur within 2 to 10 seconds. Even without a paper or paperboard layer, the water vapor resulting from the reagent is sufficient both to inflate the expandable cells and to absorb any excess heat from the microwave energy interactive material.

It will be understood that the various insulating materials of the present invention may enhance heating, browning, and/or crisping of a food item in a microwave oven. First, the water vapor, air, and other gases contained in the closed cells provide insulation between the food item and the ambient environment of the microwave oven, thereby increasing the amount of sensible heat that stays within or is transferred to the food item. Additionally, the formation of the cells allows the material to conform more closely to the surface of the food item, placing the susceptor film in greater proximity to the food item, thereby enhancing browning and/or crisping. Furthermore, insulating materials may help to retain moisture in the food item when cooking in the microwave oven, thereby improving the texture and flavor of the food item. Additional benefits and aspects of such materials are described in PCT Application No. PCT/US03/03779, U.S. Pat. Nos. 7,019,271, and 7,351,942, each of which is incorporated by reference herein in its entirety.

Any of the insulating materials described herein or contemplated hereby may include an adhesive pattern or thermal bond pattern that is selected to enhance cooking of a particular food item. For example, where the food item is a larger item, the adhesive pattern may be selected to form substantially uniformly shaped expandable cells. Where the food item is a small item, the adhesive pattern may be selected to form a plurality of different sized cells to allow the item to be variably contacted on its various surfaces. While several examples are provided herein, it will be understood that numerous other patterns are contemplated hereby, and the pattern selected will depend on the heating, browning, crisping, and insulating needs of the particular food item.

If desired, multiple layers of insulating materials may be used to enhance the insulating properties of the insulating material and, therefore, enhance the browning and crisping of the food item. Where multiple layers are used, the layers may remain separate or may be joined using any suitable process or technique, for example, thermal bonding, adhesive bonding, ultrasonic bonding or welding, mechanical fastening, or any combination thereof. In one example, two sheets of an insulating material may be arranged so that their respective susceptor film layers are facing away from each other. In another example, two sheets of an insulating material may be arranged so that their respective susceptor film layers are facing towards each other. In still another example, multiple sheets of an insulating material may be arranged in a like manner and superposed. In a still further example, multiple sheets of various insulating materials may be superposed in any other configuration as needed or desired for a particular application.

Figure 11A:
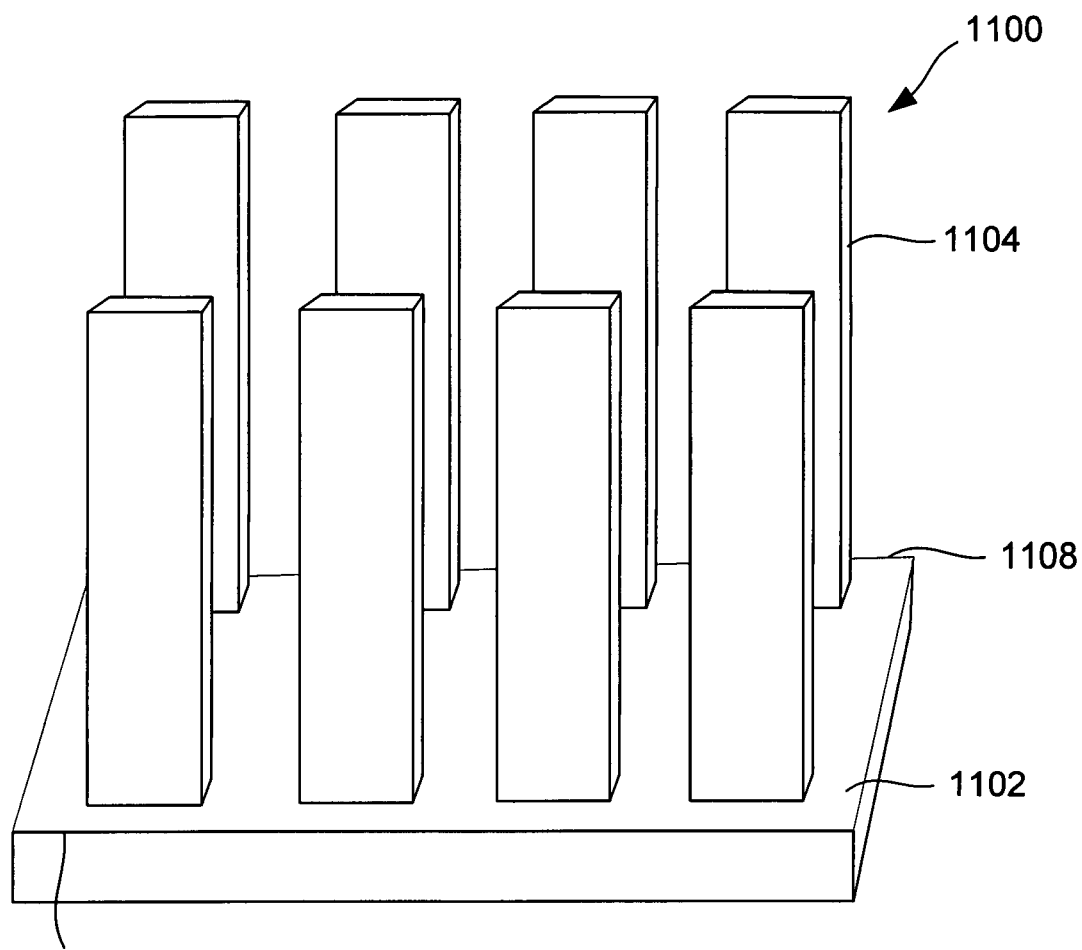
FIG. 11A schematically depicts portions of an exemplary system for heating, browning, and/or crisping one or more food items in a microwave oven, according to various aspects of the invention.
Figure 11B:
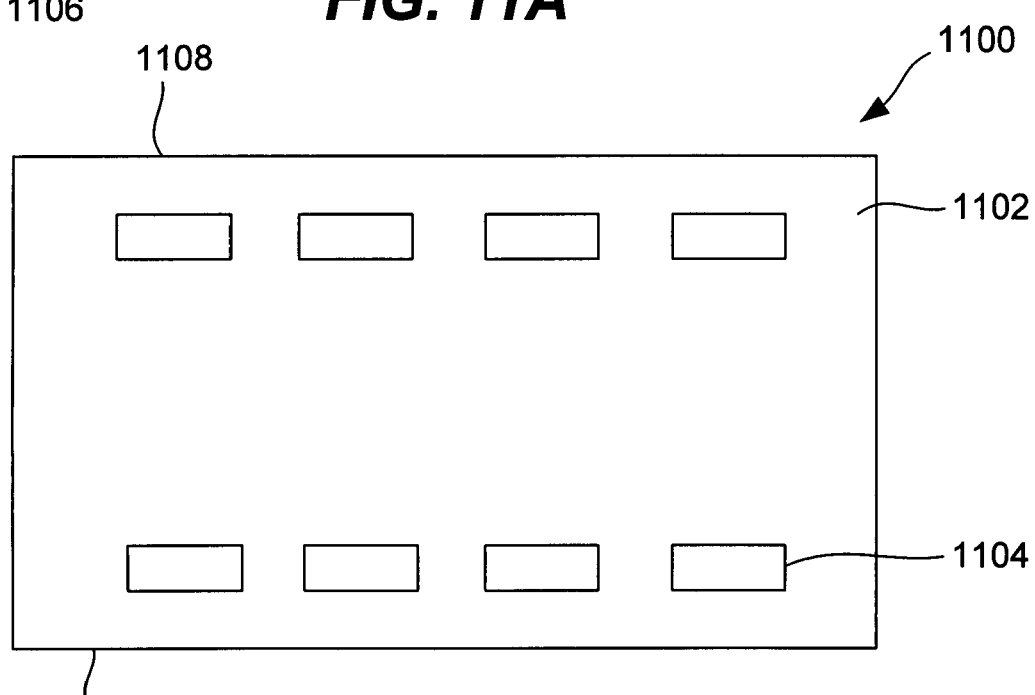
FIG. 11B is a schematic top plan view of the portions of the system shown in FIG. 11A.
Figure 11C:
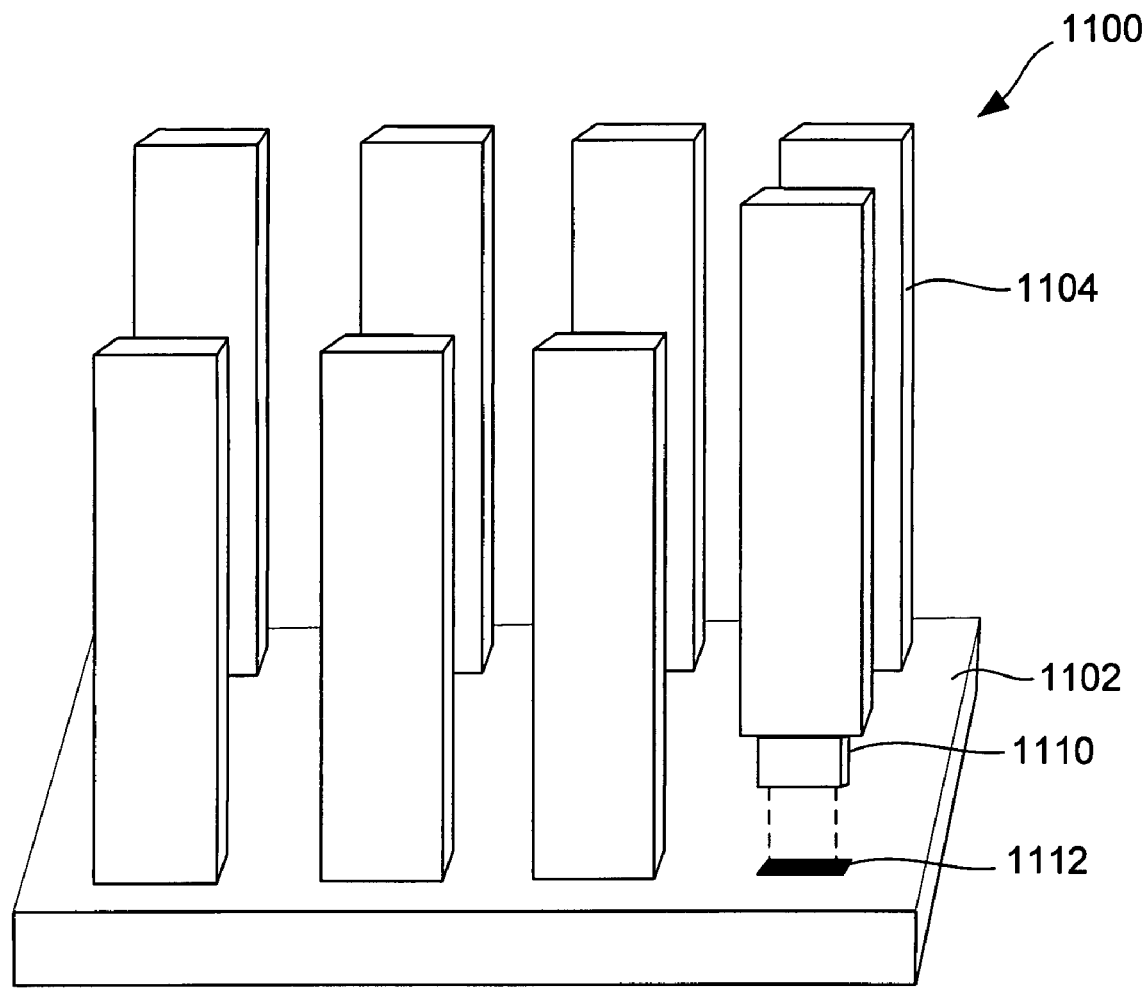
FIG. 11C is a schematic, partially exploded view of the portions of the exemplary system shown in FIG. 11A.
Figure 11D:
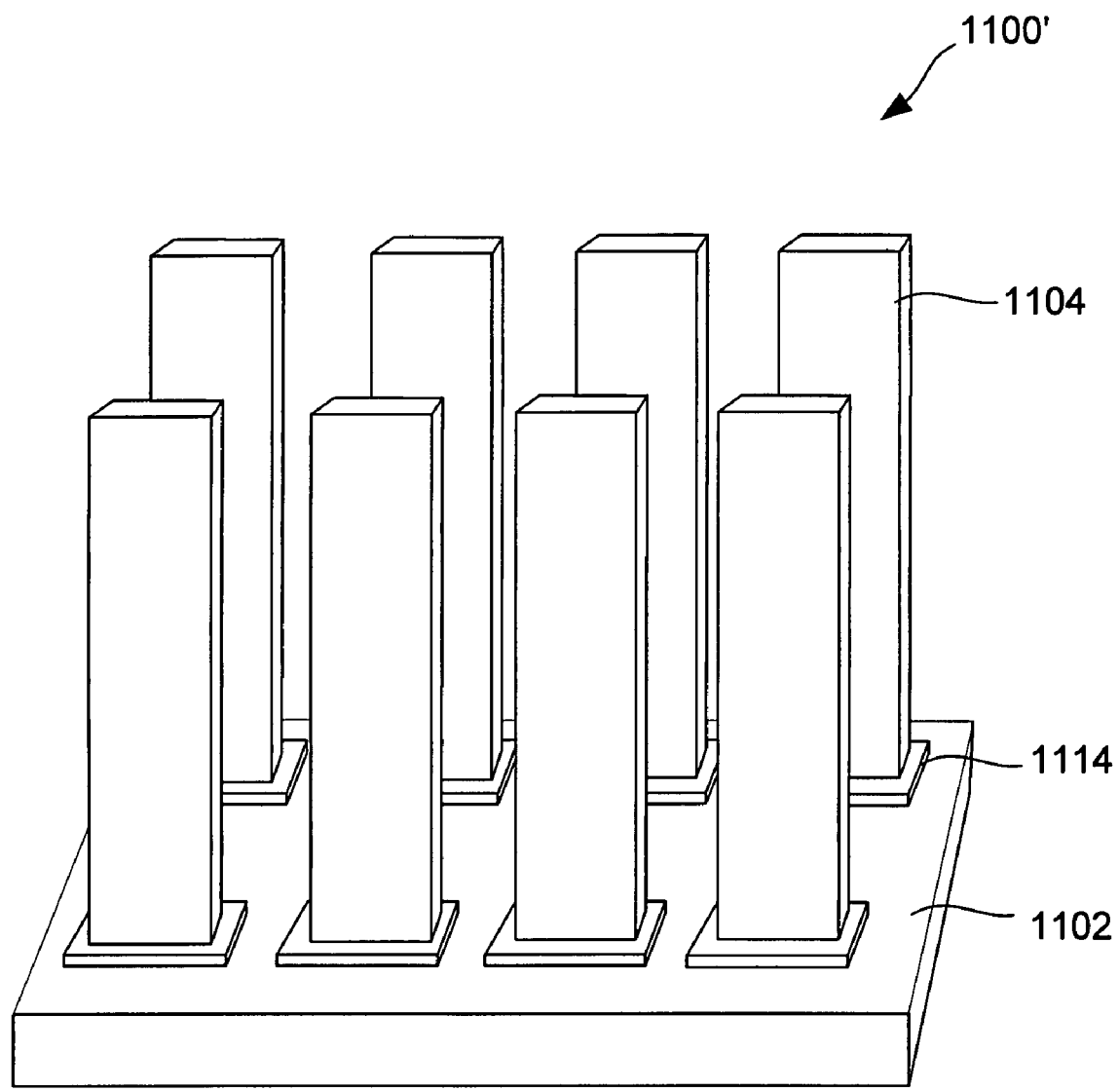
FIG. 11D schematically depicts a variation of the portions of the exemplary system shown in FIG. 11A.

In another aspect, the invention is directed generally to a system or "rack" for supporting one or more food items to be browned and/or crisped in a microwave oven. Turning now to FIG. 11A, the system 1100 includes a base 1102 and a plurality of upstanding pegs or rails 1104 arranged in parallel pairs proximate a first edge 1106 and a second edge 1108 of the base 1102. The pegs 1104 may have any shape and dimensions as needed or desired for a particular application. For example, each peg may have a flattened rectangular shape, as shown, for example, in FIGS. 11A (perspective view) and 11B (plan view). The pegs 1104 may be removably secured to the base 1102 using any suitable attachment feature. In one example shown in FIG. 11C, each peg 1104 includes at least one end 1110 sized to be received within a corresponding slot or recessed portion 1112 within the base 1102. Alternatively, the pegs 1104 may be affixed to the base 1102 and not capable of being readily separated therefrom. If desired, the pegs 1104 may be supported on pedestals or "shoulders" 1114 to provide ventilation to the food item along the base, as shown in the system 1100' of FIG. 11D.

In this and other examples, the base 1102 and the pegs 1104 may be formed from any material capable of withstanding exposure to microwave energy, for example, polypropylene, polycarbonate, polyethylene, polytetrafluoroethylene, and so on. Other materials are contemplated hereby.

Figure 11E:
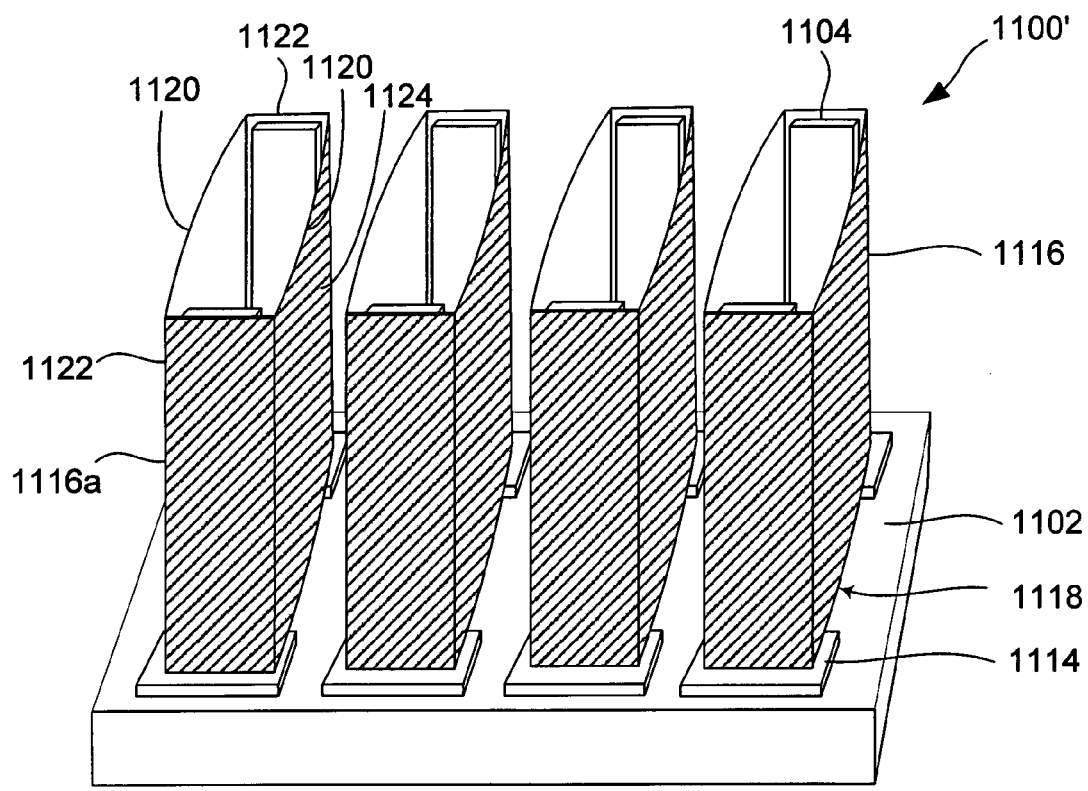
FIG. 11E schematically depicts an exemplary system for heating, browning, and/or crisping one or more food items in a microwave oven, according to various aspects of the invention.
Figure 11F:
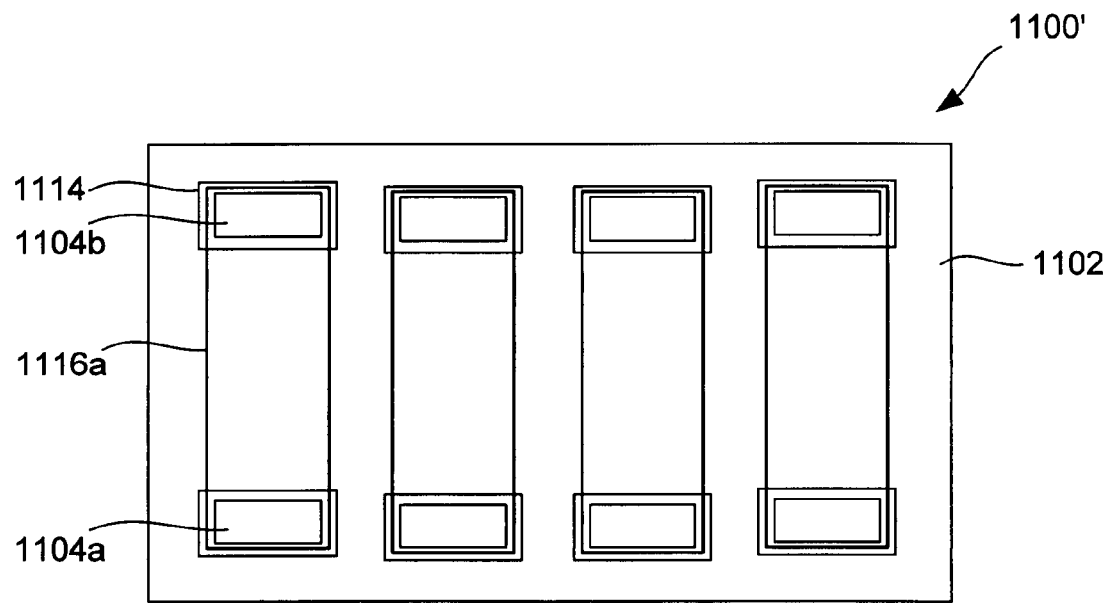
FIG. 11F is a schematic top plan view of the exemplary system illustrated in FIG. 11E.

As shown in FIG. 11E, the system 1100' also includes at least two microwave energy interactive sheaths, sleeves, or other constructs 1116 (sometimes referred to generally herein as "constructs") between which a food item is placed for heating, browning, and/or crisping. Each construct or sleeve 1116 has at least one end 1118 that is at least partially open and capable of receiving a pair of parallel pegs 1104. When the system 1100' is assembled, the sleeve 1116 is substantially perpendicular to the base 1102 and enwraps or encircles one or more pairs of parallel pegs 1104. For example, as shown in FIG. 11F in top plan view, sleeve 1116a encircles pegs 1104a and 1104b. The sleeves 1116 may rest on respective shoulders 1114 as illustrated in FIG. 11E or may be positioned above the shoulders 1114.

As shown in FIG. 11E, each sleeve 1116 includes a pair of opposed side panels or walls 1120 and a pair of opposed end panels or walls 1122, each being substantially square or rectangular in shape. However, it will be understood that in this and other aspects of the invention described herein or contemplated hereby, numerous suitable shapes and configurations may be used to form the various panels and, therefore, sleeves or constructs. Examples of other shapes encompassed hereby include, but are not limited to, polygons, circles, ovals, cylinders, prisms, spheres, polyhedrons, and ellipsoids. The shape of each construct may be determined largely by the type, shape, and quantity of the food item or items to be heated, browned, and/or crisped, and it should be understood that different constructs are contemplated for different food items, for example, pretzels, hash brown patties, pizza pockets, cheese sticks or balls, pastries, doughs, egg rolls, spring rolls, and so forth.

The sleeves 1116 generally are positioned to receive one or more food items therebetween. The sleeves 1116 may be somewhat flexible to accommodate various sizes and shapes of food items.

In each of the various examples shown in FIG. 11E-H, a microwave energy interactive element 1124 (schematically illustrated using oblique lines) overlies and may be at least partially joined to a portion of or substantially all of at least one panel 1120 or 1122. The microwave energy interactive element may be any suitable element described herein or contemplated hereby, and in one aspect, the microwave energy interactive element comprises a susceptor. A polymer film layer may overlie the microwave energy interactive element. In another aspect (not shown), the microwave energy interactive element comprises a microwave energy interactive insulating material, such as, for examples, those shown in FIGS. 6A-10, which also may include a susceptor and other layers.

In the example shown in FIG. 11E, a microwave energy interactive element 1124 overlies substantially all of and faces outwardly from each of the side panels 1120 and end panels 1122 of the sleeve 1116a. It is noted that the microwave energy interactive element overlying one of the side panels and one of the end panels is hidden from view.

Figure 11G:
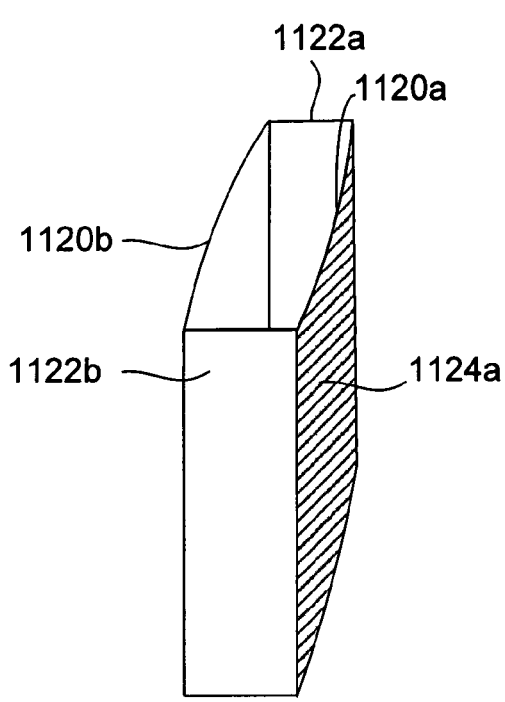
FIGS. 11G and 11H schematically depict mirror images of an exemplary microwave energy interactive sleeve that may be used in accordance with the invention, to illustrate all four sides of the sleeve.
Figure 11H:
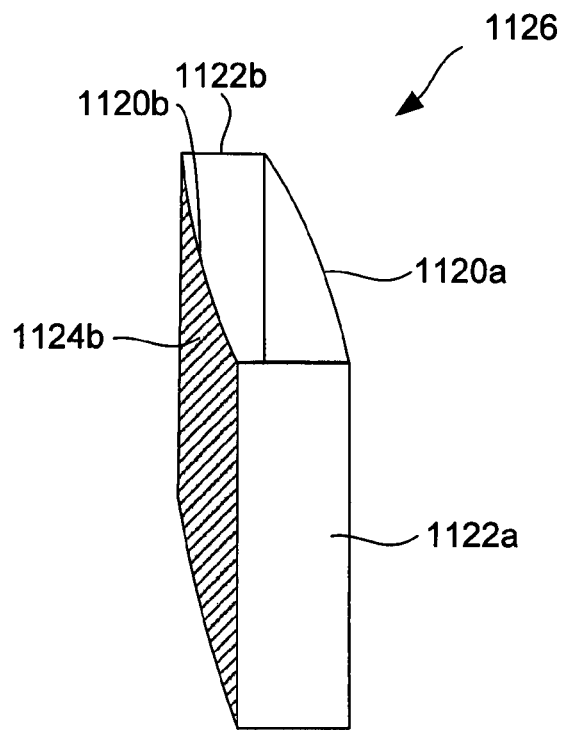

FIGS. 11G and 11H depict mirror images of another exemplary sleeve 1126 that may be used in accordance with the invention. (Mirror images are shown to illustrate all four sides of the sleeve 1126.) As shown in FIGS. 11G and 11H, microwave energy interactive elements 1124a and 1124b overlie and face outwardly from substantially all of opposed side panels 1120a and 1120b, but does not overlie either of end panels 1122a or 1122b. In one variation of this example, the sleeve 1126 is formed without a microwave energy interactive element on one or both end panels 1122a and 1122b. In another variation, one or both end panels 1122a and 1122b of the sleeve 1126 include a deactivated microwave energy interactive element (not shown). In still another variation, the sleeve 1126 is formed with a microwave energy interactive element on one or both end panels 1122a and 1122b, but the microwave energy interactive element has been removed selectively such that substantially no microwave energy interactive material is present. In any of such sleeves, the user is provided at least partially with a surface that remains substantially cool to the touch for comfortable handling. If desired, one or both ends of the sleeve may be provided with printed instructions for assembly, use, handling, or any other advertising or indicia (not shown).

Figure 11I:
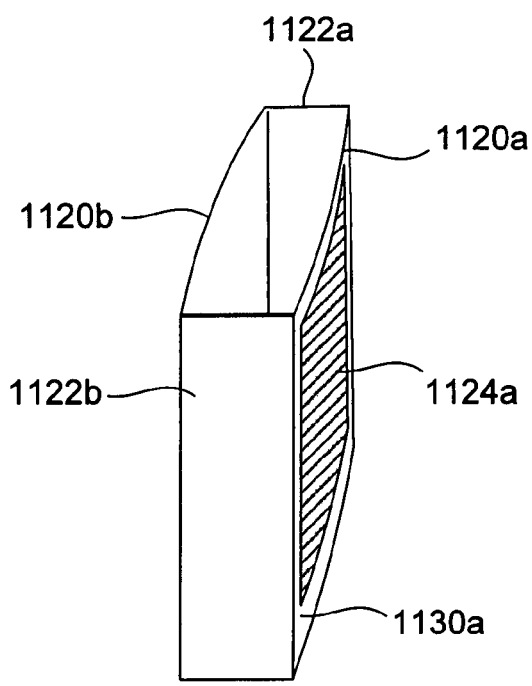
FIGS. 11I and 11J schematically depict mirror images of yet another exemplary microwave energy interactive sleeve that may be used in accordance with the invention, to illustrate all four sides of the sleeve.
Figure 11J:
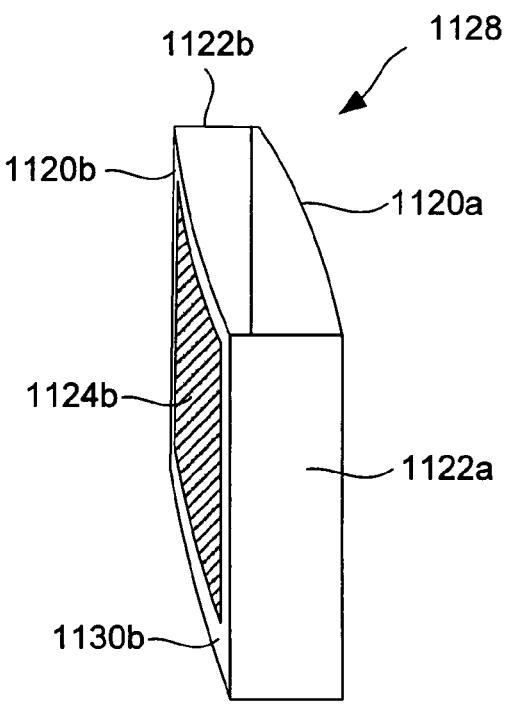

FIGS. 11I and 11J depict mirror images of yet another exemplary sleeve 1128 that may be used in accordance with the invention. (Mirror images are shown to illustrate all four sides of the sleeve 1128.) As shown in FIGS. 11I and 11J, microwave energy interactive elements 1124a and 1124b overlie and face outwardly from opposed side panels 1120a and 1120b, except along a peripheral margin or area 1130a and 1130b where overheating may occur, and does not overlie either end panel 1122a or 1122b. The end panels may be formed in any of the various manners described above with reference to FIGS. 11G and 11H. Likewise, one or both of the peripheral margins or areas 1130a and 1130b may be formed by removing a microwave energy interactive element selectively therefrom, by selectively applying the microwave energy interactive element 1124a or 1124b, and/or by selectively deactivating the microwave energy interactive element.

Figure 11K:
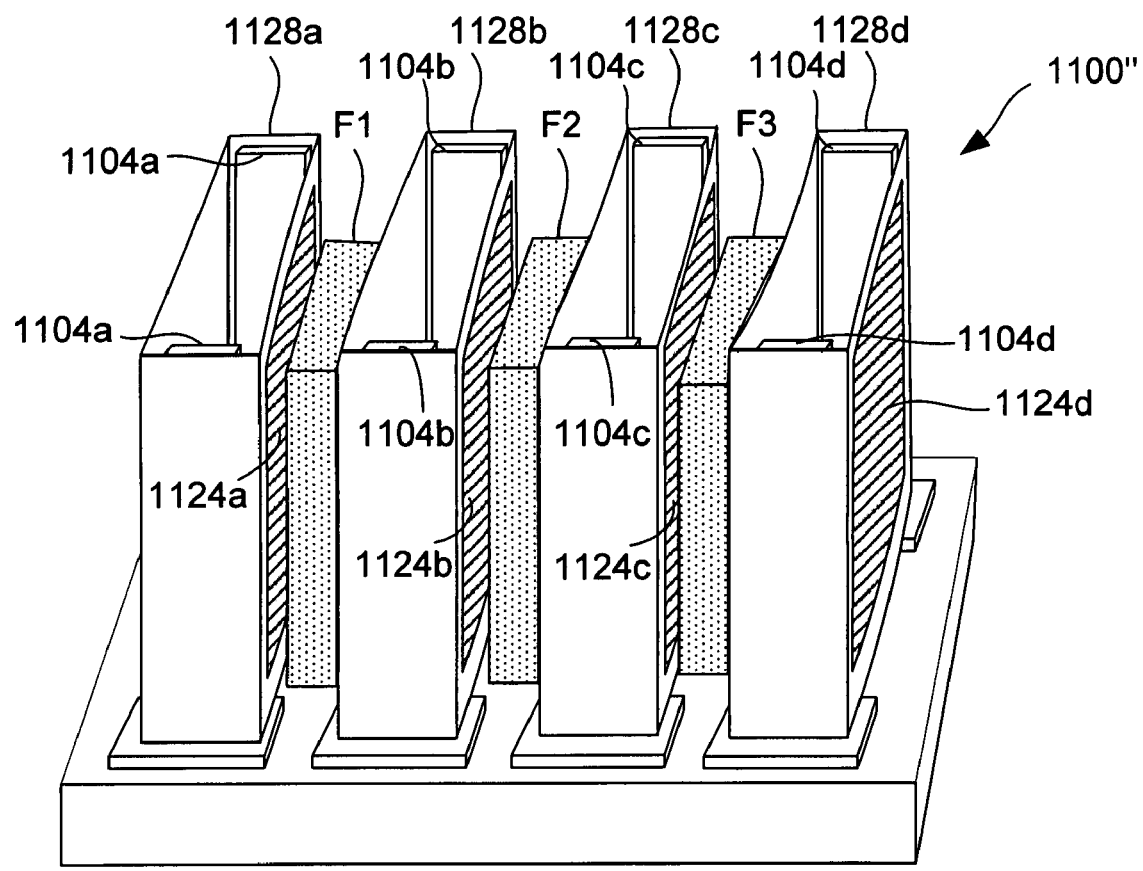
FIG. 11K schematically depicts yet another exemplary system for heating, browning, and/or crisping one or more food items in a microwave oven, with a plurality of food items, according to various aspects of the invention.

Turning now to FIG. 11K, to use any of the various systems, for example, system 1100" and sleeve 1128 (FIGS. 11I and 11J), the user places a first sleeve 1128a around a pair of parallel pegs 1104a, as shown in the figures. The user then places a second sleeve 1128b around another pair of parallel pegs 1104b, thereby creating a space for a food item F1 between the generally parallel outer surfaces of the adjacent sleeves. Additional sleeves 1128c and 1128d also may be used if desired to accommodate additional food items F2 and F3. Alternatively, where the food item is very thick (e.g., Belgian waffle versus regular waffle), adjacent sleeves may be positioned one or more pairs of pegs away from the adjacent pair of pegs, thereby creating a greater space between the generally upstanding sleeves. Where the pegs are removable, the unused pegs may be removed if desired. Thus, the system of the present invention can accommodate food items of varying thickness.

The food item then is inserted in the space between the first and second sleeves 1128a and 1128b, thereby bringing the food item into intimate or proximate contact with the microwave energy interactive elements 1124a and 1124b on the outer surfaces of the adjacent sleeves 1128a and 1128b. Upon exposure to microwave energy, the food item in intimate or proximate contact with the susceptor is browned and/or crisped.

As can be seen FIG. 11K, the sleeves 1128a, 1128b, 1128c, and 1128d may be formed from a somewhat flexible material, thereby accommodating food items of varying thickness, for example, breakfast pastries and bagels. Thus, although the food item, for example, a bagel, has a first, substantially flat surface, and a second, contoured surface, each sleeve can flex as needed to accommodate the shape of the food item.

It will be noted that the ability of the sleeve to flex inwardly, for example, to receive the bottom portion of a bagel (i.e., the bagel crust) depends on the materials used to form the sleeve and the dimensions of the sleeves and pegs. For example, in the exemplary system illustrated in the figures, the pegs are somewhat rectangular in shape, as viewed from the top of the system. The lengthwise dimension of the peg determines the distance between the opposed microwave energy interactive outer surfaces of each sleeve and, in part, the ability of the sleeve to flex away from the food item to accommodate the shape of the food item. Where greater flex is desired, wider pegs may be used to create a greater maximum inward flex distance. Conversely, where lesser flex is needed, narrower pegs may be used. To provide even greater versatility, the system may, if desired, be provided with a variety of pegs and corresponding slots and sleeves of varying dimensions and/or material type. The user then can select the arrangement of pegs and sleeves needed for the particular food item.

Furthermore, as stated above, each of the various sleeves may be formed at least partially from a microwave energy interactive material such as that shown in FIGS. 6A-10. Upon exposure to microwave energy, the expandable cells of the insulating materials bulge towards the food item, bringing the susceptor into closer proximity with the irregular surface of the food item. In doing so, browning and/or crisping of the food item may be enhanced further.

Various aspects of the invention may be understood further by way of the following example, which is not to be construed as limiting in any manner.

EXAMPLE

Two "sheets" of commercially available frozen French toast sticks were heated in an 1100 W microwave oven for about 3 minutes using a system according to the invention. The system was similar to that illustrated in FIG. 11E, except for minor construction variations that will be understood by those of skill in the art. Three sleeves were used. Each sleeve included a microwave energy interactive element comprising a susceptor supported on a 48 gauge polyethylene terephthalate film. The French toast was suitably browned and crisped.

Optionally, one or more portions of the various blanks, constructs, and/or systems described herein or contemplated hereby may be coated with varnish, clay, or other materials, either alone or in combination. The coating may then be printed over with product advertising or other information or images. The various blanks, constructs, and/or systems also may be coated to protect any information printed thereon.

Alternatively or additionally, any of the blanks, constructs, and/or systems of the present invention may be coated or laminated with other materials to impart other properties, such as absorbency, repellency, opacity, color, printability, stiffness, or cushioning. For example, absorbent susceptors are described in U.S. Provisional Application No. 60/604, 637, filed Aug. 25, 2004, and U.S. Patent Application Publication No. US 2006/0049190 A1, published Mar. 9, 2006, both of which are incorporated herein by reference in their entirety. Additionally, the constructs may include graphics or indicia printed thereon.

It will be understood that with some combinations of elements and materials, the microwave interactive element may have a grey or silver color this is visually distinguishable from the substrate or the support. However, in some instances, it may be desirable to provide a web or construct having a uniform color and/or appearance. Such a web or construct may be more aesthetically pleasing to a consumer, particularly when the consumer is accustomed to products having certain visual attributes, for example, a solid color, a particular pattern, and so on. Thus, for example, the present invention contemplates using a silver or grey toned adhesive to join the microwave interactive elements to the substrate, using a silver or grey toned substrate to mask the presence of the silver or grey toned microwave interactive element, using a dark toned substrate, for example, a black toned substrate, to conceal the presence of the silver or grey toned microwave interactive element, overprinting the metallized side of the web with a silver or grey toned ink to obscure the color variation, printing the non-metallized side of the web with a silver or grey ink or other concealing color in a suitable pattern or as a solid color layer to mask or conceal the presence of the microwave interactive element, or any other suitable technique or combination thereof.

Although certain embodiments of this invention have been described with a certain degree of particularity, those skilled in the art could make numerous alterations to the disclosed embodiments without departing from the spirit or scope of the invention as set forth in the appended claims. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

It will be recognized by those skilled in the art, that various elements discussed with reference to the various embodiments may be interchanged to create entirely new embodiments coming within the scope of the present invention. It is intended that all matter contained in the above description or shown in the accompanying drawings shall be interpreted as illustrative only and not limiting. Changes in detail or structure may be made without departing from the spirit and scope of the invention. The detailed description set forth herein is not intended nor is to be construed to limit the present invention or otherwise to exclude any such other embodiments, adaptations, variations, modifications, and equivalent arrangements of the present invention.

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the present invention as set forth in the appended claims.

While the present invention is described herein in detail in relation to specific aspects, it is to be understood that this detailed description is only illustrative and exemplary of the present invention and is made merely for purposes of providing a full and enabling disclosure of the present invention. The detailed description set forth herein is not intended nor is to be construed to limit the present invention or otherwise to exclude any such other embodiments, adaptations, variations, modifications, and equivalent arrangements of the present invention.

What is claimed is:

1. A construct for supporting a plurality of food items, the construct comprising:
    a first separator panel and a second separator panel joined to one another;
    a first base panel joined to the first separator panel, the first base panel including a first locking feature disposed along an edge of the construct; and
    a second base panel joined to the second separator panel, the second base panel including a second locking feature disposed along the edge of the construct, the first locking feature and the second locking feature being for engaging one another to at least partially maintain the first separator panel and the second separator panel in a substantially facing relationship with one another, wherein
        the first locking feature is defined by a first cut extending inwardly substantially from the edge of the construct, and
        the second locking feature is defined by a second cut extending inwardly substantially from the edge of the construct.

2. The construct of claim 1, wherein the first locking feature and the second locking feature engaging one another comprises overlapping the first locking feature over the second locking feature, such that the first locking feature is adjacent to the second separator panel and the second locking feature is adjacent to the first separator panel.

3. The construct of claim 1, wherein
    the first base panel is joined to the first separator panel along a first fold line, the first fold extending in a direction substantially transverse to the edge of the construct, and
    the first cut comprises
        an arcuate cut extending inwardly substantially from the edge of the construct, and
        an oblique cut extending from the arcuate cut substantially to the first fold line, the oblique cut extending in a direction towards the edge of the construct.

4. The construct of claim 3, wherein the oblique cut at least partially defines a locking projection of the first locking feature, the locking projection being for engaging the second separator panel.

5. The construct of claim 3, wherein
    the second base panel is joined to the second separator panel along a second fold line, the second fold extending in a direction substantially transverse to the edge of the construct, and
    the second cut comprises
        an arcuate cut extending inwardly substantially from the edge of the construct, and
        a transverse cut substantially collinear with the second fold line.

6. The construct of claim 3, wherein
    the second base panel is joined to the second separator panel along a second fold line, the second fold extending in a direction substantially transverse to the edge of the construct, and
    the second cut comprises
        an arcuate cut extending inwardly substantially from the edge of the construct, and
        an oblique cut extending from the arcuate cut in a direction away from the second fold line and away from the edge of the construct.

7. The construct of claim 1, wherein
    the edge of the construct is a first edge of the construct,
    the first base panel includes a third locking feature along a second edge of the construct, the second edge of the construct being opposite the first edge, and
    the second base panel includes a fourth locking feature along the second edge of the construct, the third locking feature and the fourth locking feature being for engaging one another to at least partially maintain the first separator panel and the second separator panel in a substantially facing relationship with one another.

8. The construct of claim 1, wherein at least one of the first separator panel, the second separator panel, the first base panel, and the second base panel comprises microwave energy interactive material.

9. The construct of claim 8, wherein the microwave energy interactive material is operative for converting at least a portion of impinging microwave energy into thermal energy.

10. A construct for supporting a plurality of food items, the construct comprising:
    a plurality of divider walls, the divider walls each comprising a first separator panel and a second separator panel foldably joined to one another;

a plurality of base panels, the base panels each being located between and connecting an adjacent pair of divider walls; and at least one locking feature disposed along an edge of the construct, the at least one locking feature maintaining the first separator panel and the second separator panel in a substantially facing relationship with one another, wherein the at least one locking feature comprises a first locking feature and a second locking feature interlocked with one another along the edge of the construct, the first locking feature being defined by a first cut extending inwardly substantially from the edge of the construct, and the second locking feature being defined by a second cut extending inwardly substantially from the edge of the construct.

11. The construct of claim 10, wherein
the plurality of base panels includes a first base panel and a second base panel,
the first base panel includes the first locking feature, and
the second base panel includes the second locking feature.

12. The construct of claim 10, wherein the first cut comprises
an arcuate cut extending inwardly substantially from the edge of the construct, and
an oblique cut extending from the arcuate cut towards the edge of the construct.

13. The construct of claim 12, wherein the oblique cut at least partially defines a locking projection of the first locking feature.

14. The construct of claim 13, wherein the locking projection of the first locking feature engages the second separator panel.

15. The construct of claim 10, wherein the second cut comprises
an arcuate cut extending inwardly substantially from the edge of the construct, and
a transverse cut extending from the arcuate cut away from the edge of the construct.

16. The construct of claim 10, wherein the second cut comprises
an arcuate cut extending inwardly substantially from the edge of the construct, and
an oblique cut extending from the arcuate cut away from the edge of the construct.

17. The construct of claim 10, wherein
the edge of the construct is a first edge of the construct,
the first base panel includes a third locking feature disposed along a second edge of the construct, the second edge of the construct being opposite the first edge, and
the second base panel includes a fourth locking feature disposed along the second edge of the construct, the third locking feature and the fourth locking feature being interlocked with one another.

18. The construct of claim 10, wherein the divider walls are substantially upright, such that the divider walls are substantially perpendicular to the base panels.

19. The construct of claim 10, wherein the divider walls are substantially flattened, such that the divider walls are substantially parallel to the base panels.

20. The construct of claim 10, wherein each adjacent pair of divider walls and the respective base panel between the respective divider walls define a receptacle for receiving a food item.

21. The construct of claim 10, wherein at least one of the plurality of divider walls and the plurality of base panels comprises microwave energy interactive material.

22. The construct of claim 21, wherein the microwave energy interactive material is operative for converting at least a portion of impinging microwave energy into thermal energy.

23. A construct for supporting a plurality of food items, the construct comprising:
a divider wall comprising a first separator panel and a second separator panel foldably joined to one another; and
a base panel foldably joined to the first separator panel, the base panel including
a first locking feature defined by a first cut extending inwardly from a first edge of the construct, and
a second locking feature defined by a second cut extending inwardly from a second edge of the construct, the first edge and the second edge being opposite one another,
wherein the first locking feature and the second locking feature each include a locking projection, the locking projection of the first locking feature and the locking projection of the second locking feature being for engaging the second separator panel to maintain the first separator panel and the second separator panel in a substantially facing relationship with one another.

24. The construct of claim 23, wherein the first cut and the second cut each comprise
an arcuate cut extending inwardly substantially from the respective first edge or second edge of the construct, and
an oblique cut extending from the arcuate cut towards the respective first edge or second edge of the construct.

25. The construct of claim 23, wherein
the base panel is a first base panel, and
the construct further comprises a second base panel foldably joined to the second separator panel, the second base panel including
a first locking feature defined by a first cut extending inwardly from the first edge of the construct, and
a second locking feature defined by a second cut extending inwardly from the second edge of the construct, wherein
the first locking feature of the first base panel is for overlapping the first locking feature of the second base panel, and
the second locking feature of the first base panel is for overlapping the second locking feature of the second base panel.

26. The construct of claim 23, wherein at least one of the first separator panel, the second separator panel, and the plurality of base panels comprises microwave energy interactive material.

27. The construct of claim 26, wherein the microwave energy interactive material is operative for converting at least a portion of impinging microwave energy into thermal energy.

28. A blank for forming a construct, comprising:
a plurality of adjoined panels, the plurality of adjoined panels each having a first dimension extending in a first direction and a second dimension extending in a second direction substantially perpendicular to the first direction, the plurality of adjoined panels including
a first separator panel and a second separator panel joined along a first fold line extending in the first direction,
a first base panel joined to the first separator panel along a second fold line extending in the first direction, and a second base panel joined to the second separator panel along a third fold line extending in the first direction; and a locking feature disposed along a first edge of the blank, the first edge of the blank extending in the second direction, wherein the locking feature is for maintaining the first separator panel and the second separator panel in a substantially facing relationship with one another when the blank is erected into the construct.

29. The blank of claim 28, wherein
the locking feature comprises a first locking feature, and
the blank comprises a second locking feature, the first locking feature and the second locking feature for being interlocked with one another when the blank is erected into the construct.

30. The blank of claim 29, wherein
the first base panel comprises the first locking feature, the first locking feature being defined by a first cut extending inwardly substantially from the first edge of the blank, and
the second base panel includes the second locking feature, the second locking feature being disposed along the first edge of the blank, the second locking feature being defined by a second cut extending inwardly substantially from the first edge of the blank.

31. The blank of claim 30, wherein the first cut comprises
an arcuate cut extending inwardly substantially from the first edge of the blank, and
an oblique cut extending from the arcuate cut towards the first edge of the blank.

32. The blank of claim 31, wherein the oblique cut at least partially defines a locking projection of the first locking feature.

33. The blank of claim 30, wherein the second cut comprises
an arcuate cut extending inwardly substantially from the first edge of the blank, and
a transverse cut extending from the arcuate cutaway from the first edge of the blank.

34. The blank of claim 30, wherein the second cut comprises
an arcuate cut extending inwardly substantially from the first edge of the blank, and
an oblique cut extending from the arcuate cut away from the first edge of the blank.

35. The blank of claim 30, wherein
the first base panel includes a third locking feature defined by a third cut extending inwardly substantially from a second edge of the blank, the second edge of the blank extending in the second direction, the second edge of the blank being opposite the first edge of the blank, and
the second base panel includes a fourth locking feature along the second edge of the blank, the fourth locking feature being defined by a fourth cut extending inwardly substantially from the second edge of the blank.

36. The blank of claim 35, wherein the second locking feature and the fourth locking feature are for being interlocked with one another when the blank is erected into the construct.

37. The blank of claim 35, wherein
the first fold line extends substantially between the first edge of the blank and the second edge of the blank,
the second fold line extends substantially between the first locking feature and the third locking feature of the first base panel, and
the third fold line extends between the second locking feature and the fourth locking feature of the second base panel.

38. The blank of claim 28, wherein at least one panel of the plurality of adjoined panels comprises microwave energy interactive material.

39. The blank of claim 38, wherein the microwave energy interactive material is operative for converting at least a portion of impinging microwave energy into thermal energy.

* * * * *

UNITED STATES PATENT AND TRADEMARK OFFICE
CERTIFICATE OF CORRECTION

| | |
|---|---|
| PATENT NO. | : 7,994,456 B2 |
| APPLICATION NO. | : 11/729583 |
| DATED | : August 9, 2011 |
| INVENTOR(S) | : Colin Ford |

It is certified that error appears in the above-identified patent and that said Letters Patent is hereby corrected as shown below:

Patent cover page, section (75) Inventors, delete "Daniel J. Keefe, Cincinnati, OH (US)"

Signed and Sealed this
Third Day of January, 2012

David J. Kappos
*Director of the United States Patent and Trademark Office*